United States Patent
Tsai et al.

(10) Patent No.: US 10,001,624 B2
(45) Date of Patent: Jun. 19, 2018

(54) ANNULAR OPTICAL ELEMENT, IMAGING LENS ASSEMBLY, IMAGING APPARATUS AND ELECTRONIC DEVICE

(71) Applicant: LARGAN PRECISION CO., LTD., Taichung (TW)

(72) Inventors: Jung-Lieh Tsai, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 5 days.

(21) Appl. No.: 15/387,694

(22) Filed: Dec. 22, 2016

(65) Prior Publication Data

US 2018/0106983 A1   Apr. 19, 2018

(30) Foreign Application Priority Data

Oct. 13, 2016   (TW) .............................. 105133084 A

(51) Int. Cl.
| | |
|---|---|
| *G02B 9/08* | (2006.01) |
| *G02B 13/00* | (2006.01) |
| *G02B 5/00* | (2006.01) |
| *G02B 7/02* | (2006.01) |

(52) U.S. Cl.
CPC .......... *G02B 13/001* (2013.01); *G02B 5/005* (2013.01); *G02B 7/021* (2013.01)

(58) Field of Classification Search
CPC ....... G02B 13/001; G02B 5/005; G02B 7/021
USPC ................. 359/558, 566, 619, 708, 738–741
See application file for complete search history.

(56) References Cited

U.S. PATENT DOCUMENTS

| | | | |
|---|---|---|---|
| 7,545,583 B2 | 6/2009 | Hiyashi et al. | |
| 7,787,184 B2 | 8/2010 | Yoshikawa et al. | |
| 9,158,086 B2 | 10/2015 | Shindo et al. | |
| 9,279,916 B2 | 3/2016 | Murata et al. | |
| 2014/0191129 A1* | 7/2014 | Jang ...................... | G01J 5/0022 |
| | | | 250/338.3 |

FOREIGN PATENT DOCUMENTS

| | | |
|---|---|---|
| TW | M527093 U | 8/2016 |
| TW | M529856 U | 10/2016 |

\* cited by examiner

*Primary Examiner* — William Choi
(74) *Attorney, Agent, or Firm* — McClure, Qualey & Rodack, LLP

(57) ABSTRACT

An annular optical element includes a first side surface, a second side surface, an outer annular surface and an inner annular surface. The outer annular surface connects the first side surface and the second side surface, and surrounds a central axis of the annular optical element. The inner annular surface connects the first side surface and the second side surface, surrounds the central axis, and is closer to the central axis than the outer annular surface is to the central axis. The inner annular surface includes a plurality of protrusion circles surrounding the central axis and arranged along a direction from the first side surface towards the second side surface. Each of the protrusion circles includes a plurality of protrusion structures and a plurality of separation structures, and the protrusion structures and the separation structures are alternately arranged to surround the central axis.

28 Claims, 28 Drawing Sheets

ANNULAR OPTICAL ELEMENT, IMAGING LENS ASSEMBLY, IMAGING APPARATUS AND ELECTRONIC DEVICE

RELATED APPLICATIONS

This application claims priority to Taiwan Application Serial Number 105133084, filed Oct. 13, 2016, which is herein incorporated by reference.

BACKGROUND

Technical Field

The present disclosure relates to an annular optical element, an imaging lens assembly and an imaging apparatus. More particularly, the present disclosure relates to an annular optical element, an imaging lens assembly and an imaging apparatus which are applicable to portable electronic devices.

Description of Related Art

Due to the popularity of personal electronic products and mobile communication products having camera functionalities, such as smart phones and tablet personal computers, the demand for compact imaging lens assemblies has been increasing and the requirements for high resolution and image quality of present compact imaging lens assemblies increase significantly.

An annular optical element is generally used to provide an optical space between any two lens elements and locate lens elements of an imaging lens assembly. A surface property of the annular optical element relates to an effect of suppressing the stray light. Accordingly, an image quality of the imaging lens assembly is influenced by the surface property of the annular optical element.

A conventional annular optical element is typically formed by an injection molding method and has a smooth and bright surface, which is featured with high reflectivity. As a result, the stray light reflected from the aforementioned surface of the conventional annular optical element cannot be effectively attenuated.

Another conventional annular optical element is provided for suppressing the stray light. The conventional annular optical element is atomized with a surface treatment, so that a reflectivity thereof is reduced. However, the effect of attenuating the stray light is still limited. Therefore, the conventional annular optical element cannot satisfy the requirements of high-end optical systems with camera functionalities.

Given the above, how to improve the surface property of the annular optical element for enhancing the image quality of compact imaging lens assemblies has become one of the important subjects.

SUMMARY

According to one aspect of the present disclosure, an annular optical element includes a first side surface, a second side surface, an outer annular surface and an inner annular surface. The second side surface is located correspondingly to the first side surface. The outer annular surface connects the first side surface and the second side surface, and surrounds a central axis of the annular optical element. The inner annular surface connects the first side surface and the second side surface, surrounds the central axis, and is closer to the central axis than the outer annular surface is to the central axis. The inner annular surface includes a plurality of protrusion circles surrounding the central axis and arranged along a direction from the first side surface towards the second side surface. Each of the protrusion circles includes a plurality of protrusion structures and a plurality of separation structures, and the protrusion structures and the separation structures are alternately arranged to surround the central axis. When a height difference between each of the protrusion structures and one of the separation structures adjacent to thereof of each of the protrusion circles is H, the following condition is satisfied: 0.02 mm<H<0.20 mm.

According to another aspect of the present disclosure, an imaging lens assembly includes a barrel, a lens set and at least one annular optical element. The lens set is disposed in the barrel and includes a plurality of lens elements. The annular optical element is disposed in the barrel and includes a first side surface, a second side surface, an outer annular surface and an inner annular surface. The second side surface is located correspondingly to the first side surface. The outer annular surface connects the first side surface and the second side surface, and surrounds a central axis of the annular optical element. The inner annular surface connects the first side surface and the second side surface, surrounds the central axis, and is closer to the central axis than the outer annular surface is to the central axis. The inner annular surface includes a plurality of protrusion circles surrounding the central axis and arranged along a direction from the first side surface towards the second side surface. Each of the protrusion circles includes a plurality of protrusion structures and a plurality of separation structures, and the protrusion structures and the separation structures are alternately arranged to surround the central axis. When a greatest distance between the first side surface and the second side surface is T, and a height difference between each of the protrusion structures and one of the separation structures adjacent to thereof of each of the protrusion circles is H, the following condition is satisfied: 3.0<T/H<31.0.

According to another aspect of the present disclosure, an imaging apparatus includes the imaging lens assembly according to the foregoing aspect and an image sensor, wherein the image sensor is disposed on an image surface of the imaging lens assembly.

According to another aspect of the present disclosure, an electronic device includes the imaging apparatus according to the foregoing aspect.

DETAILED DESCRIPTION

1st Embodiment

Figure 1A:
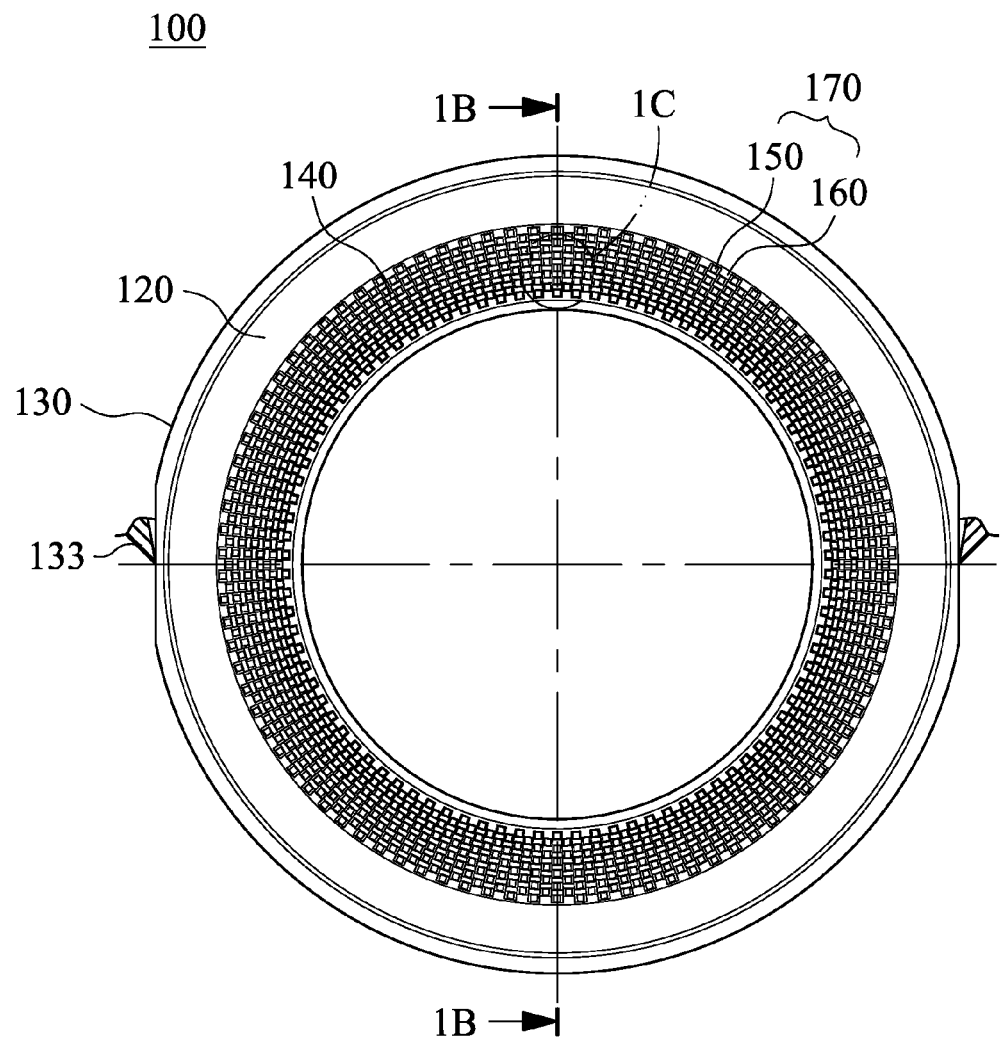
FIG. 1A is a schematic view of an annular optical element according to the 1st embodiment of the present disclosure.
Figure 1B:
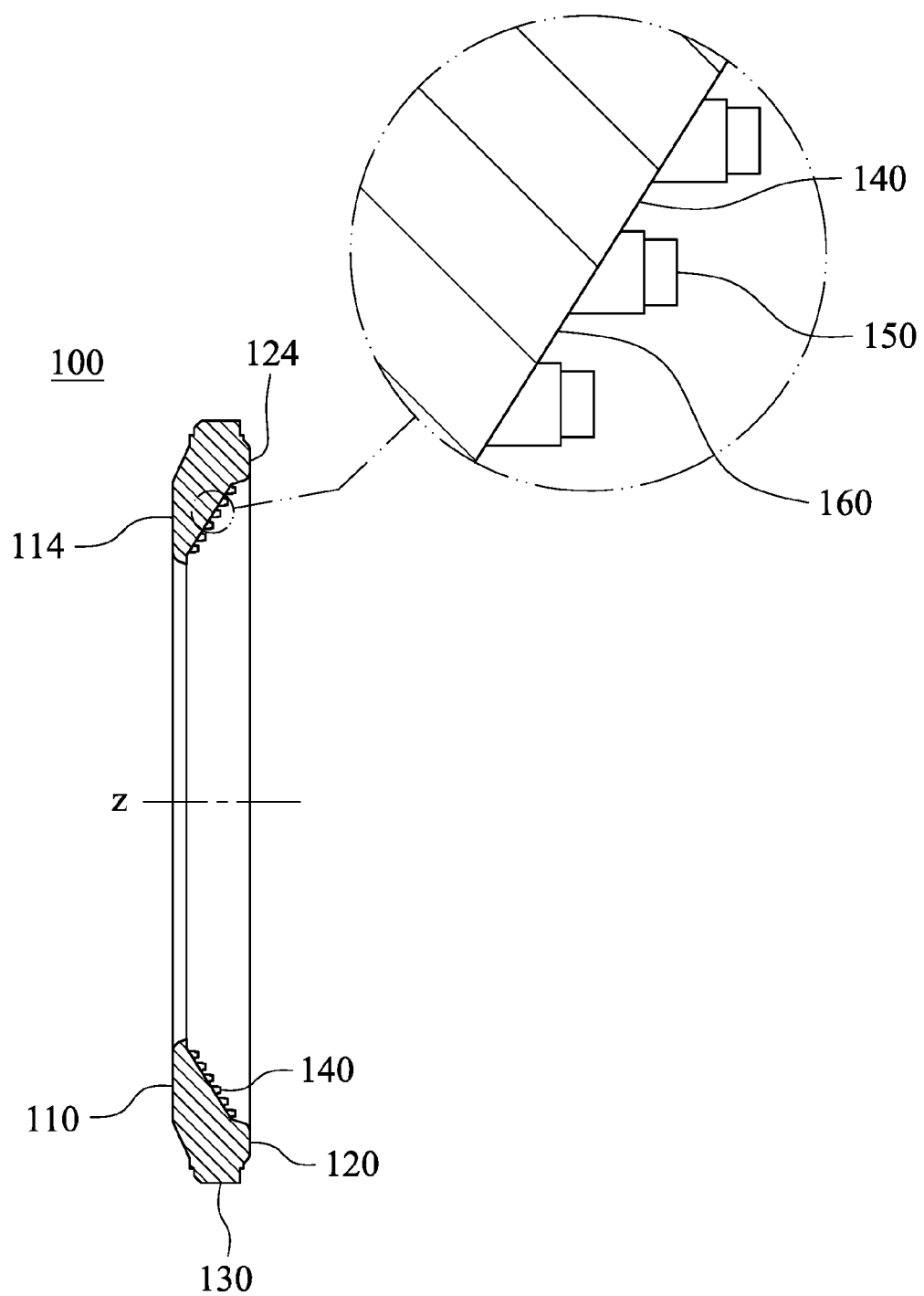
FIG. 1B is a cross-sectional view along line 1B-1B of FIG. 1A.

FIG. 1A is a schematic view of an annular optical element 100 according to the 1st embodiment of the present disclosure, and FIG. 1B is a cross-sectional view along line 1B-1B of FIG. 1A. In FIG. 1A and FIG. 1B, the annular optical element 100 includes a first side surface 110, a second side surface 120, an outer annular surface 130 and an inner annular surface 140. The second side surface 120 is located correspondingly to the first side surface 110. The outer annular surface 130 connects the first side surface 110 and the second side surface 120, and surrounds a central axis z of the annular optical element 100. The inner annular surface 140 connects the first side surface 110 and the second side surface 120, surrounds the central axis z, and is closer to the central axis z than the outer annular surface 130 is to the central axis z. In the 1st embodiment, the first side surface 110 and the second side surface 120 respectively include receiving surfaces 114 and 124, which are both flat surfaces orthogonal to the central axis z.

Figure 1C:
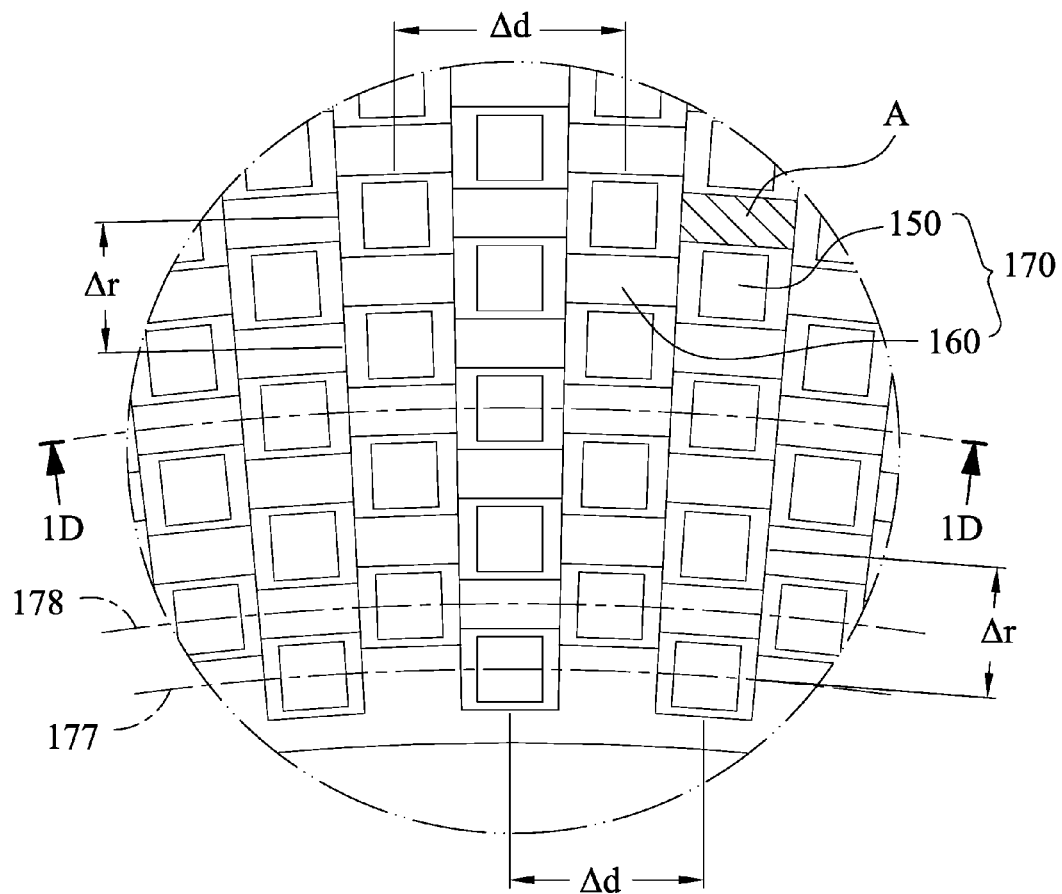
FIG. 1C is an enlarged view of part 10 in FIG. 1A.

FIG. 1C is an enlarged view of part 10 in FIG. 1A. In FIG. 1A to FIG. 1C, the inner annular surface 140 includes a plurality of protrusion circles 170 surrounding the central axis z and arranged along a direction from the first side surface 110 towards the second side surface 120. It can be said that the protrusion circles 170 are arranged along a direction from the second side surface 120 towards the first side surface 110. Each of the protrusion circles 170 includes a plurality of protrusion structures 150 and a plurality of separation structures 160, and the protrusion structures 150 and the separation structures 160 of each of the protrusion circles 170 are alternately arranged to surround the central axis z. That is, between any two protrusion structures 150 closest to each other of each of the protrusion circles 170 is one of the separation structures 160, and between any two separation structures 160 closest to each other of each of the protrusion circles 170 is one of the protrusion structures 150.

Figure 1D:
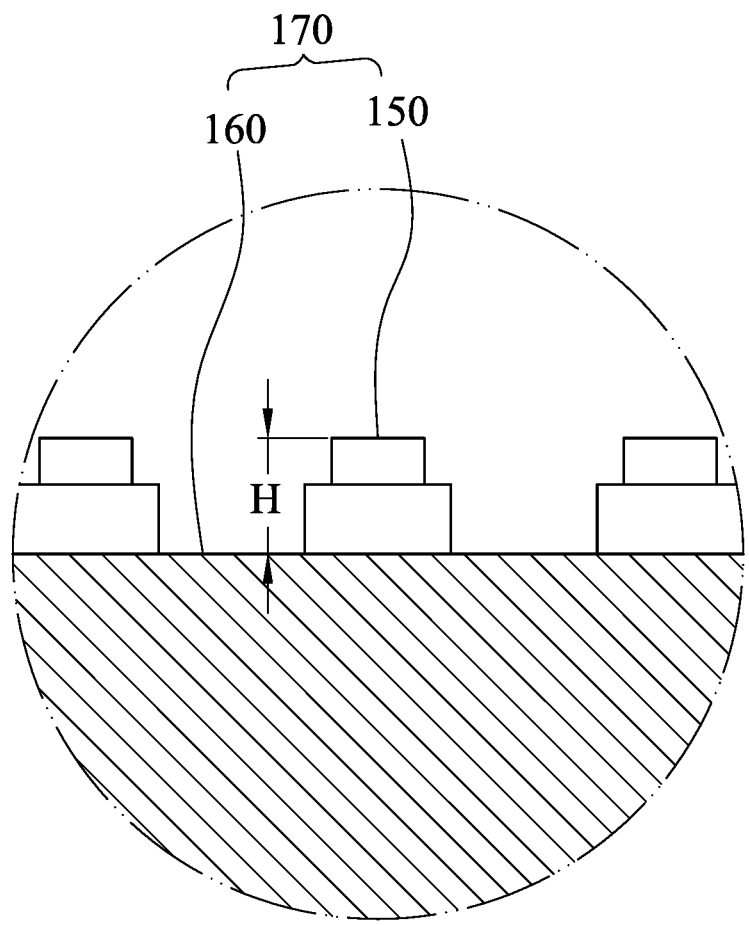
FIG. 1D is a cross-sectional view along line 1D-1D of FIG. 1C.

FIG. 1D is a cross-sectional view along line 1D-1D of FIG. 1C, and also a cross-sectional view of each of the protrusion circles 170 of the inner annular surface 140. In FIG. 1D, when a height difference between each of the protrusion structures 150 and one of the separation structures 160 adjacent to thereof of each of the protrusion circles 170 is H, the following condition is satisfied: 0.02 mm<H<0.20 mm. Therefore, it is favorable for effectively attenuating the stray light reflected from the annular optical element 100, so that the image quality of the imaging lens assembly can be enhanced, and the production efficiency can be raised. Preferably, the following condition can be satisfied: 0.03 mm<H<0.14 mm. A proper dimensional range for precision machining could be provided.

Figure 1E:
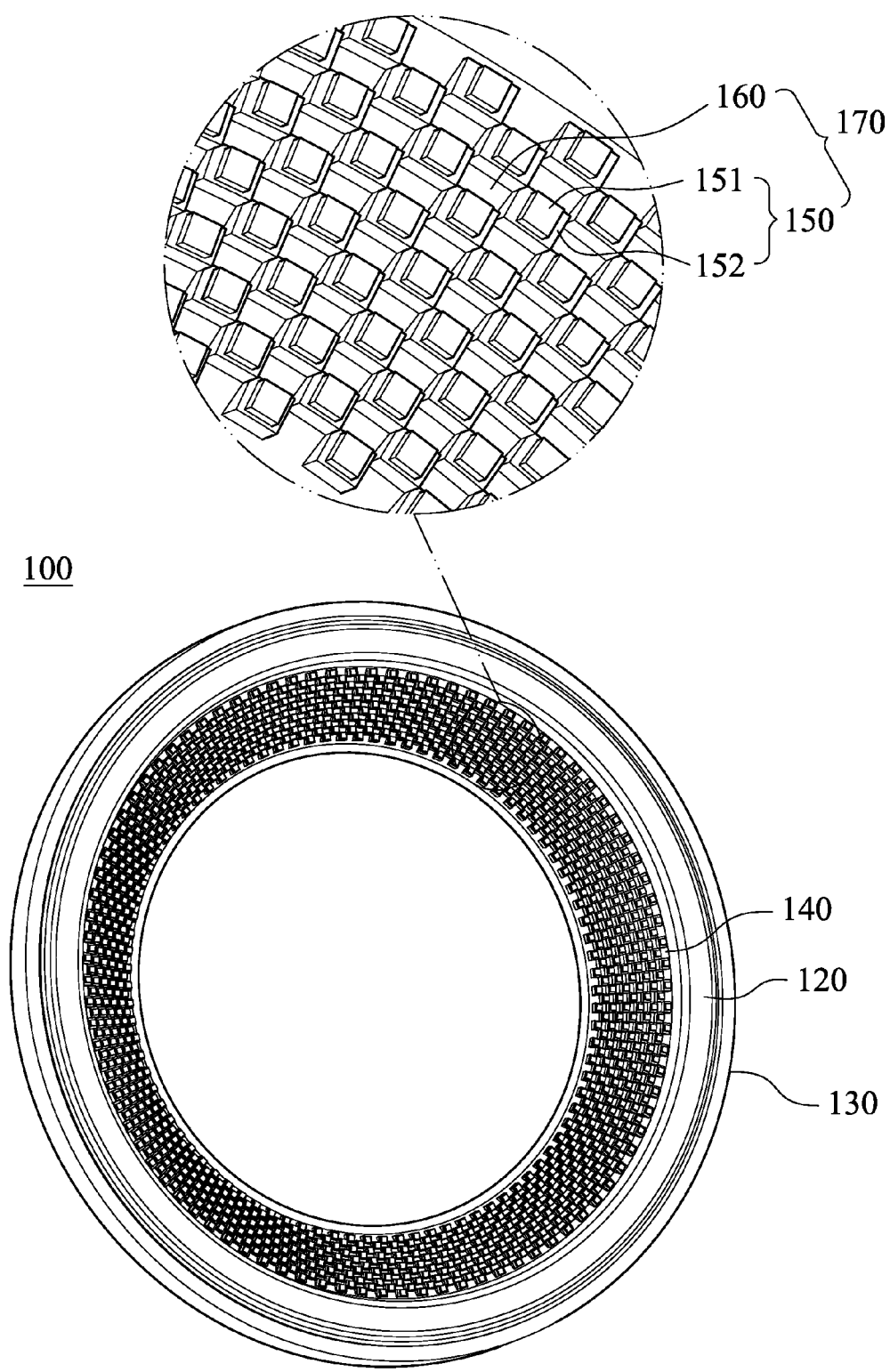
FIG. 1E is a three-dimensional view of the annular optical element according to the 1st embodiment.
Figure 1F:
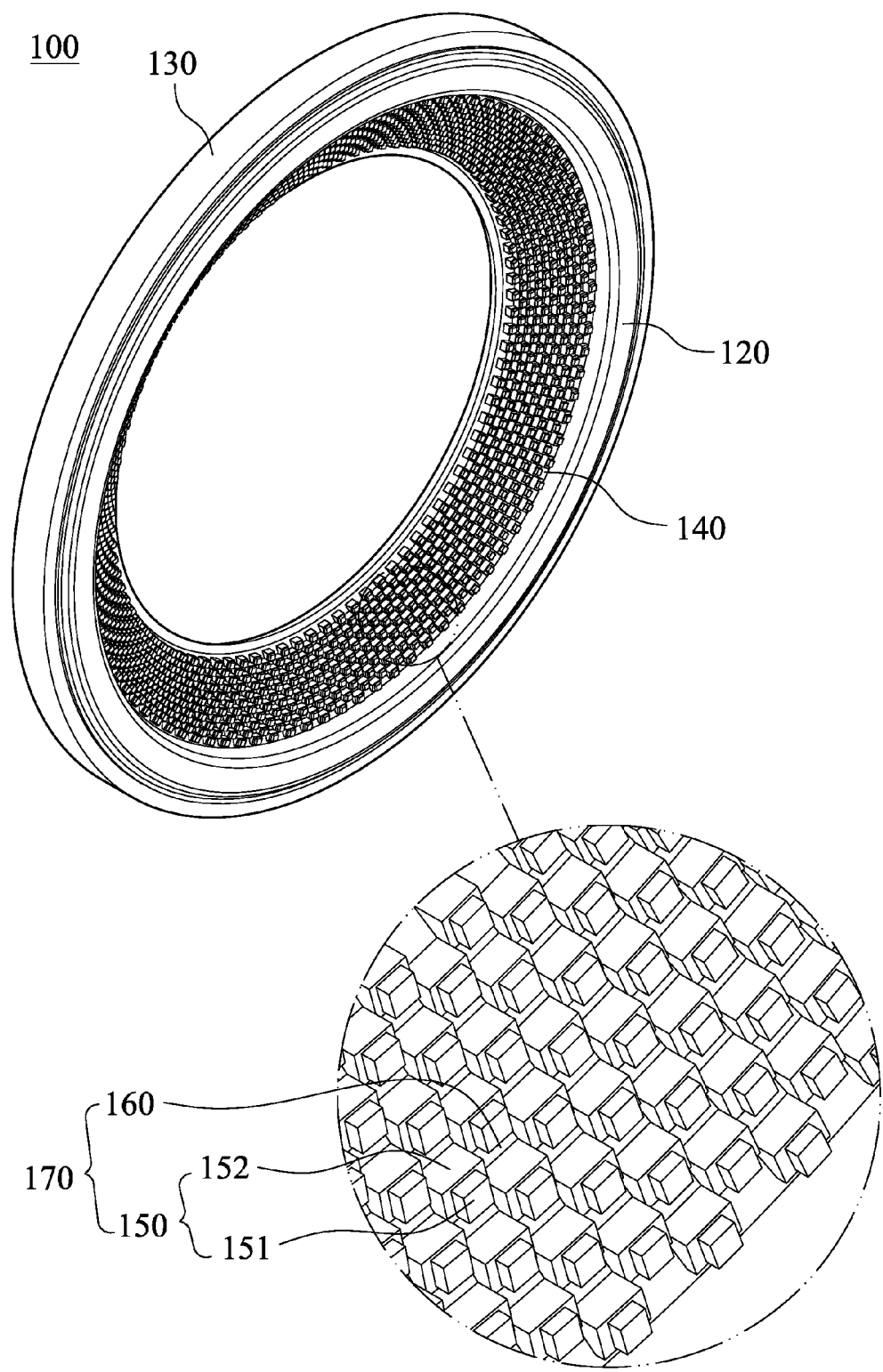
FIG. 1F is another three-dimensional view of the annular optical element according to the 1st embodiment.

In detail, FIG. 1E is a three-dimensional view of the annular optical element 100 according to the 1st embodiment, and FIG. 1F is another three-dimensional view of the annular optical element 100 according to the 1st embodiment. In FIG. 1E and FIG. 1F, the annular optical element 100 with the protrusion structures 150 can be formed integrally. Therefore, it is favorable for simplifying the manufacturing complexity of the annular optical element 100.

The annular optical element 100 can be made of a black plastic material and formed by an injection molding method. Therefore, it is favorable for mass production of the annular optical element 100. In the 1st embodiment, the annular optical element 100 can be processed by a mold surface treatment of precision machined to have the protrusion structures 150 and the separation structures 160, which are fine structures to reduce the reflected light. The injection molding method, which is used to directly form the annular optical element 100 with the protrusion structures 150 and the separation structures 160, is beneficial to raise the production efficiency, reduce the difference between the product and the design drawing, and achieve the function yielded by the protrusion structures 150 and the separation structures 160 alternately arranged.

In FIG. 1A, the outer annular surface 130 of the annular optical element 100 can include at least two gate traces 133 formed by the injection molding method and symmetrically located around the central axis z. Therefore, it is favorable for maintaining the structural integrity of the annular optical element 100 after injection molding. In the 1st embodiment, the outer annular surface 130 includes two gate traces 133 symmetrically located around the central axis z.

In FIG. 1A and FIG. 1C, when a center-to-center spacing distance between one of the protrusion structures 150 and another of the protrusion structures 150 closest to thereof of each of the protrusion circles 170 is Δd, and a center-to-center spacing distance between the one protrusion structure 150 and one of the protrusion structures 150 of another of the protrusion circles 170 closest to the one protrusion circle 170 in the direction from the first side surface 110 towards the second side surface 120 is Δr, the following condition can be satisfied: 0.4<Δd/Δr<3.0. Therefore, it is favorable for the inner annular surface 140 with the protrusion structures 150 and the separation structures 160 to have a certain effect of attenuating reflection for light with various incident angles.

Each of the protrusion structures 150 of one of the protrusion circles 170 and one of the separation structures 160 of another of the protrusion circles 170 adjacent to the one protrusion circle 170 can be aligned in the direction from the first side surface 110 towards the second side surface 120. Therefore, it is favorable for increasing the machining smoothness of the annular optical element 100. Numbers of the protrusion structures 150 of all of the protrusion circles 170 can be equal. That is, a number of the protrusion structures 150 of any of the protrusion circles 170 can be equal to a number of the protrusion structures 150 of any another of the protrusion circles 170. In the 1st embodiment, each of the protrusion structures 150 of one of the protrusion circles 170 and one of the separation structures 160 of another of the protrusion circles 170 adjacent to the one protrusion circle 170 are aligned in the direction from the first side surface 110 towards the second side surface 120. Numbers of the protrusion structures 150 of all of the protrusion circles 170 are equal.

In FIG. 1C, the protrusion circles 170 of the inner annular surface 140 in the 1st embodiment are composed of a plurality of odd-numbered protrusion circles 177 and a plurality of even-numbered protrusion circles 178. The odd-numbered protrusion circles 177 and the even-numbered protrusion circles 178 are alternately arranged along the direction from the first side surface 110 towards the second side surface 120. That is, one of the odd-numbered protrusion circles 177 and one of the even-numbered protrusion circles 178 are adjacent to each other. Furthermore, each of the protrusion structures 150 of one of the odd-numbered protrusion circles 177 and one of the separation structures 160 of one of the even-numbered protrusion circles 178 adjacent to the one odd-numbered protrusion circle 177 are aligned in the direction from the first side surface 110 towards the second side surface 120. Each of the protrusion structures 150 of one of the even-numbered protrusion circles 178 and one of the separation structures 160 of one of the odd-numbered protrusion circles 177 adjacent to the one even-numbered protrusion circle 178 are aligned in the direction from the first side surface 110 towards the second side surface 120. One of the protrusion structures 150 of every of the odd-numbered protrusion circles 177 and one of the separation structures 160 of every of the even-numbered protrusion circles 178 are alternately arranged along the direction from the first side surface 110 towards the second side surface 120. One of the separation structures 160 of every of the odd-numbered protrusion circles 177 and one of the protrusion structures 150 of every of the even-numbered protrusion circles 178 are alternately arranged along the direction from the first side surface 110 towards the second side surface 120. In other embodiments (not shown herein), each of the protrusion structures of one of the protrusion circles and one of the separation structures of another of the protrusion circles adjacent to the one protrusion circle may not be aligned in the direction from the first side surface towards the second side surface.

In FIG. 1C and FIG. 1E, a bottom cross-section of each of the protrusion structures 150 can be quadrilateral. Therefore, it is favorable for reducing the light reflected from the annular optical element 100. Preferably, the bottom cross-section of each of the protrusion structures 150 can be isosceles quadrilateral. Therefore, it is suitable for the annular appearance of the annular optical element 100. In the 1st embodiment, centers of all the protrusion circles 170 are respectively located on various points of the central axis z. A direction from the first side surface 110 towards the second side surface 120 of each of the protrusion structures 150 is orthogonal to all the protrusion circles 170. The bottom cross-section of each of the protrusion structures 150 is isosceles quadrilateral, and isosceles trapezoid in detail. Due to each of the protrusion structures 150 is located on the inner annular surface 140, two parallel sides of the bottom cross-section of each of the protrusion structures 150 can be featured with arc or curve.

Each of the separation structures 160 can be isosceles quadrilateral. It can be said that each of the separation structures 160 as a whole can be isosceles quadrilateral. Therefore, it is suitable for the annular appearance of the inner annular surface 140. In the 1st embodiment, each of the separation structures 160 is isosceles quadrilateral, and isosceles trapezoid in detail. Due to each of the separation structures 160 is located on the inner annular surface 140, two parallel sides of each of the separation structures 160 can be featured with arc or curve.

In FIG. 1C, when an area of each of the separation structures 160 is A, the following condition can be satisfied: $0.005 \text{ mm}^2 < 10 \times A < 0.08 \text{ mm}^2$. Therefore, it is favorable for balancing the manufacturability of the annular optical element 100 and the denseness of the protrusion structures 150. In practice, measure areas of ten separation structures 160 first, and then take the average value among the ten areas as the area (i.e. the value of parameter A) of each of the separation structures 160. It would reduce the measuring errors and improve the measuring accuracy.

When the center-to-center spacing distance between one of the protrusion structures 150 and another of the protrusion structures 150 closest to thereof of each of the protrusion circles 170 is Δd, the following condition can be satisfied: 0.06 mm<Δd<0.21 mm. Therefore, it is favorable for maintaining the effect of reducing reflected light of the annular optical element 100. In the 1st embodiment, all the protrusion structures 150 of one of the odd-numbered protrusion circles 177 have the same values of the parameter Δd shown as the lower right in FIG. 1C, and all the protrusion structures 150 of one of the even-numbered protrusion circles 178 have the same values of the parameter Δd shown as the upper left in FIG. 1C. Furthermore, all values of the parameter Δd of the odd-numbered protrusion circles 177 and the even-numbered protrusion circles 178 are approximate. Along with the protrusion circles 170 one by one arranged from the second side surface 120 towards the first side surface 110, the circumferences of the protrusion circles 170 are slightly smaller and smaller one by one, the values of the parameter Δd are slightly smaller and smaller, and the protrusion structures 150 are arranged more densely and more densely. In other embodiments (not shown herein), values of parameter Δd of one of the protrusion circles may be different.

When the center-to-center spacing distance between one of the protrusion structures 150 of one of the protrusion circles 170 and one of the protrusion structures 150 of another of the protrusion circles 170 closest to the one protrusion circle 170 in the direction from the first side surface 110 towards the second side surface 120 is Δr, the following condition can be satisfied: 0.03 mm<Δr<0.16 mm. Therefore, it is favorable for maintaining the effect of reducing reflected light of the annular optical element 100. In the 1st embodiment, all the protrusion structures 150 of all the odd-numbered protrusion circles 177 have the same values of the parameter Δr shown as the lower right in FIG. 1C, and all the protrusion structures 150 of all the even-numbered protrusion circles 178 have the same values of the parameter Δr shown as the upper left in FIG. 1C. Furthermore, all values of the parameter Δr of all the odd-numbered protrusion circles 177 and all the even-numbered protrusion circles 178 are the same. In other embodiments (not shown herein), values of parameter Δr of the annular optical element may be different.

In FIG. 1B, FIG. 1D and FIG. 1E, each of the protrusion structures 150 can be a two-step structure. Therefore, the protrusion structures 150 of the annular optical element 100 are finer to enhance the effect of attenuating the stray light. In the 1st embodiment, each of the protrusion structures 150 is the two-step structure.

Moreover, in the 1st embodiment, all the protrusion structures 150 have the same structures with approximate dimensions. Along with the protrusion circles 170 one by one arranged from the second side surface 120 towards the first side surface 110, the dimensions of the protrusion structures 150 are slightly smaller and smaller. In other embodiments (not shown herein), all the protrusion structures may have different structures.

Figure 1G:
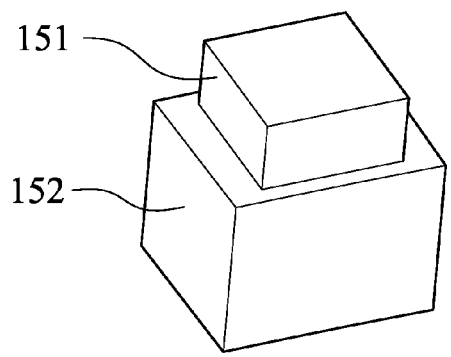
FIG. 1G is a three-dimensional view of the protrusion structure according to the 1st embodiment.
Figure 1H:
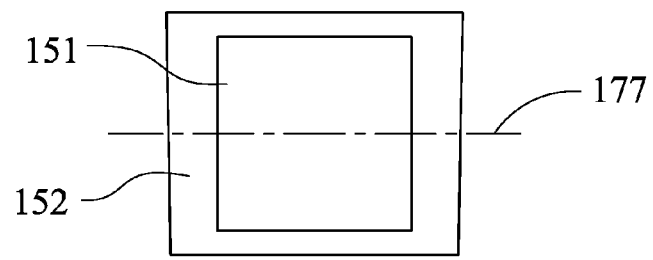
FIG. 1H is a plane view of the protrusion structure according to the 1st embodiment.
Figure 1I:
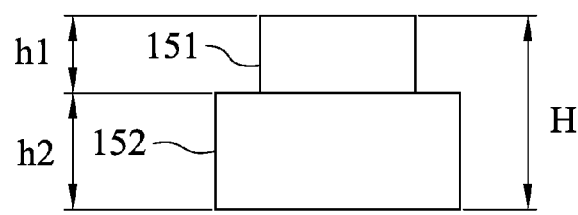
FIG. 1I is a side view of the protrusion structure according to the 1st embodiment.

FIG. 1G is a three-dimensional view of the protrusion structure 150 according to the 1st embodiment, FIG. 1H is a plane view of the protrusion structure 150 according to the 1st embodiment, and FIG. 1I is a side view of the protrusion structure 150 according to the 1st embodiment. It shown in FIG. 1H is also a plane view of each of the protrusion structures 150 of the odd-numbered protrusion circles 177 in FIG. 1C and a plane view of each of the protrusion structures 150 of the even-numbered protrusion circles 178 in FIG. 1C. In FIG. 1G to FIG. 1I, each of the protrusion structures 150 can include a first step structure 151 and a second step structure 152, wherein the first step structure 151 is farther from the bottom cross-section of the protrusion structure 150 than the second step structure 152 is from the bottom cross-section of the protrusion structure 150. In detail, the first step structure 151 is recessed relative to the second step structure 152 both in the circumferential direction of the protrusion circle 170 and in the direction from the first side surface 110 towards the second side surface 120. When the height difference between the protrusion structure 150 and one of the separation structures 160 adjacent to thereof of the protrusion circle 170 is H, a height of the first step structure 151 is h1, and a height of the second step structure 152 is h2, the following conditions can be satisfied: H=h1+h2; and 0.25<h1/h2<3.3. Therefore, it is favorable for maintaining the structural integrity of the protrusion structures 150 after injection molding.

In FIG. 1A and FIG. 1E, when a number of the protrusion structures 150 of the annular optical element 100 is N, the following condition can be satisfied: 420<N<2000. Therefore, it is favorable for balancing the manufacturability of the annular optical element 100 and the denseness of the protrusion structures 150. Preferably, the following condition can be satisfied: 650<N<1500. In the 1st embodiment, the annular optical element 100 can be processed by a mold surface treatment of precision machined to have the protrusion structures 150 and the separation structures 160, which are fine structures to reduce the reflected light. The injection molding method, which is used to directly form the annular optical element 100 with the protrusion structures 150 and the separation structures 160, is beneficial to raise the production efficiency.

The data of the aforementioned parameters of the annular optical element 100 according to the 1st embodiment of the present disclosure are listed in the following Table 1, wherein the parameters are also shown as FIG. 1C, FIG. 1D and FIG. 1I.

TABLE 1

| 1st Embodiment | | | |
|---|---|---|---|
| 10 × A (mm²) | 0.0189 | h1/h2 | 0.667 |
| H (mm) | 0.05 | Δd (mm) | 0.12 |
| h1 (mm) | 0.02 | Δr (mm) | 0.08 |
| h2 (mm) | 0.03 | Δd/Δr | 1.50 |
| h1 + h2 (mm) | 0.05 | | |

2nd Embodiment

Figure 2A:
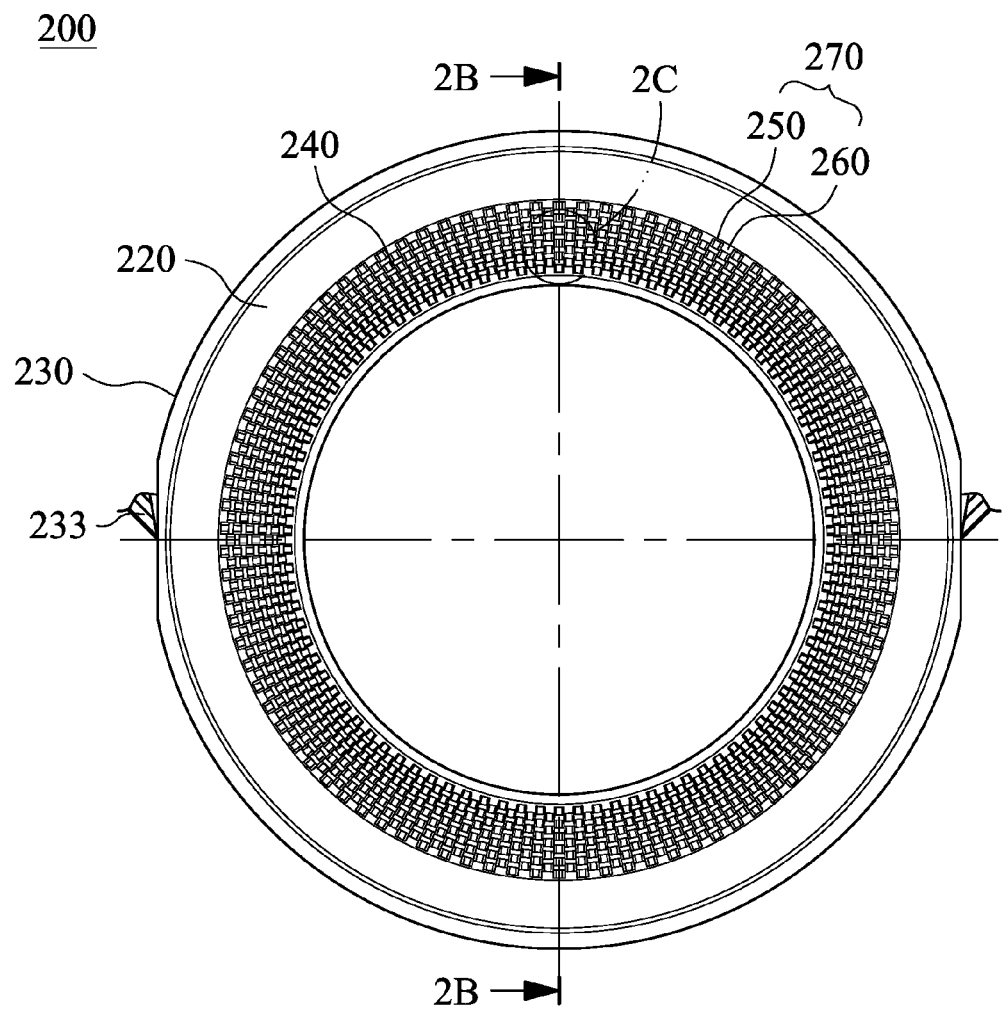
FIG. 2A is a schematic view of an annular optical element according to the 2nd embodiment of the present disclosure.
Figure 2B:
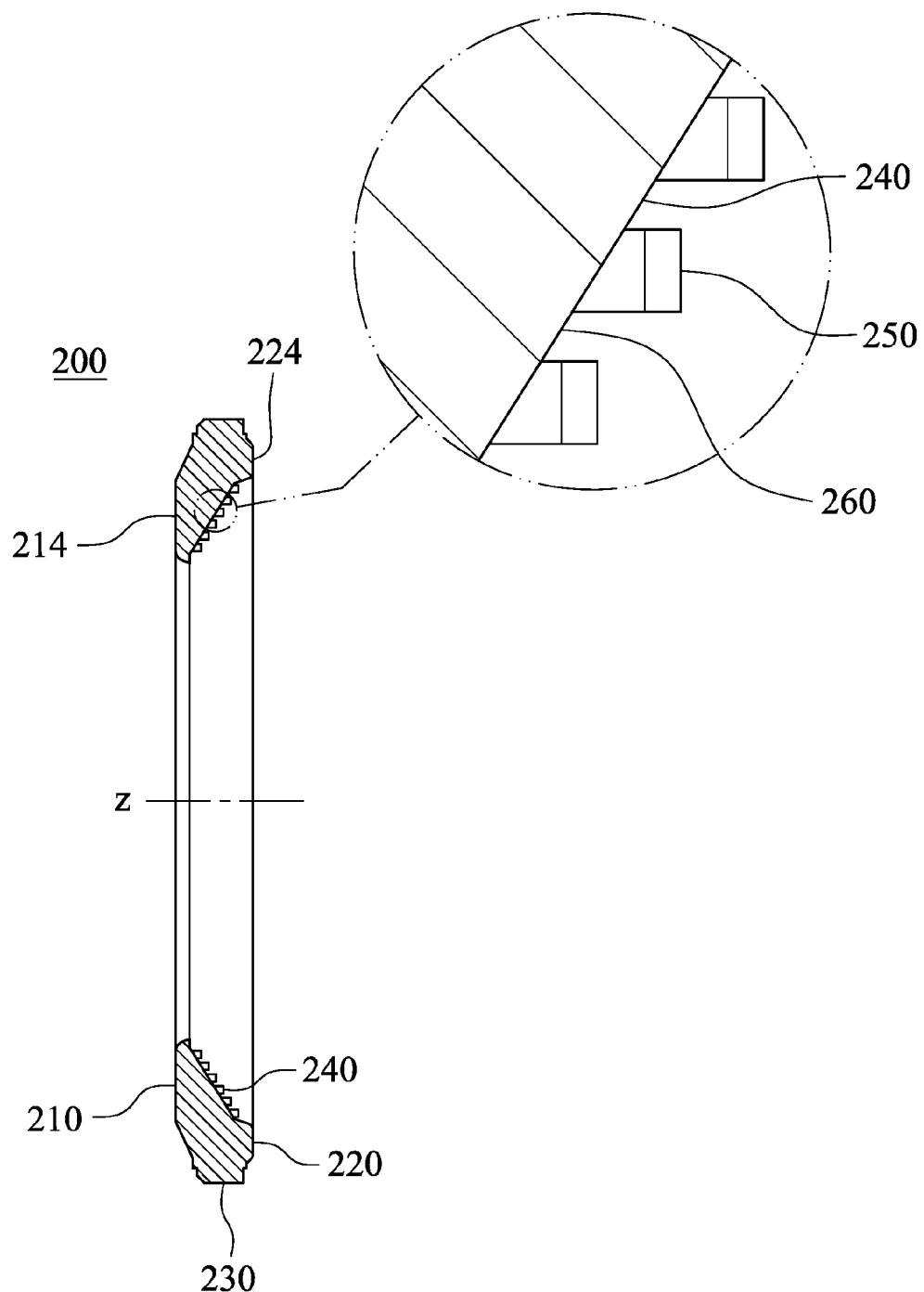
FIG. 2B is a cross-sectional view along line 2B-2B of FIG. 2A.

FIG. 2A is a schematic view of an annular optical element 200 according to the 2nd embodiment of the present disclosure, and FIG. 2B is a cross-sectional view along line 2B-2B of FIG. 2A. In FIG. 2A and FIG. 2B, the annular optical element 200 includes a first side surface 210, a second side surface 220, an outer annular surface 230 and an inner annular surface 240. The second side surface 220 is located correspondingly to the first side surface 210. The outer annular surface 230 connects the first side surface 210 and the second side surface 220, and surrounds a central axis z of the annular optical element 200. The inner annular surface 240 connects the first side surface 210 and the second side surface 220, surrounds the central axis z, and is closer to the central axis z than the outer annular surface 230 is to the central axis z. In the 2nd embodiment, the first side surface 210 and the second side surface 220 respectively include receiving surfaces 214 and 224, which are both flat surfaces orthogonal to the central axis z.

Figure 2C:
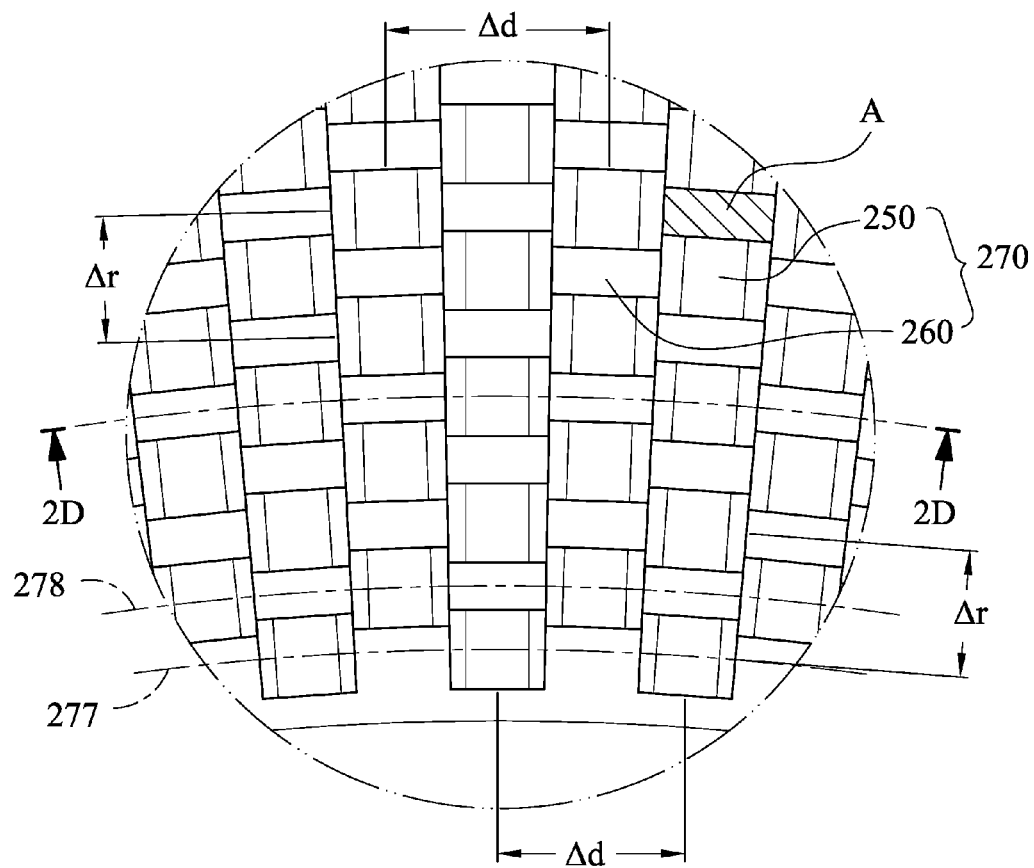
FIG. 2C is an enlarged view of part 2C in FIG. 2A.
Figure 2D:
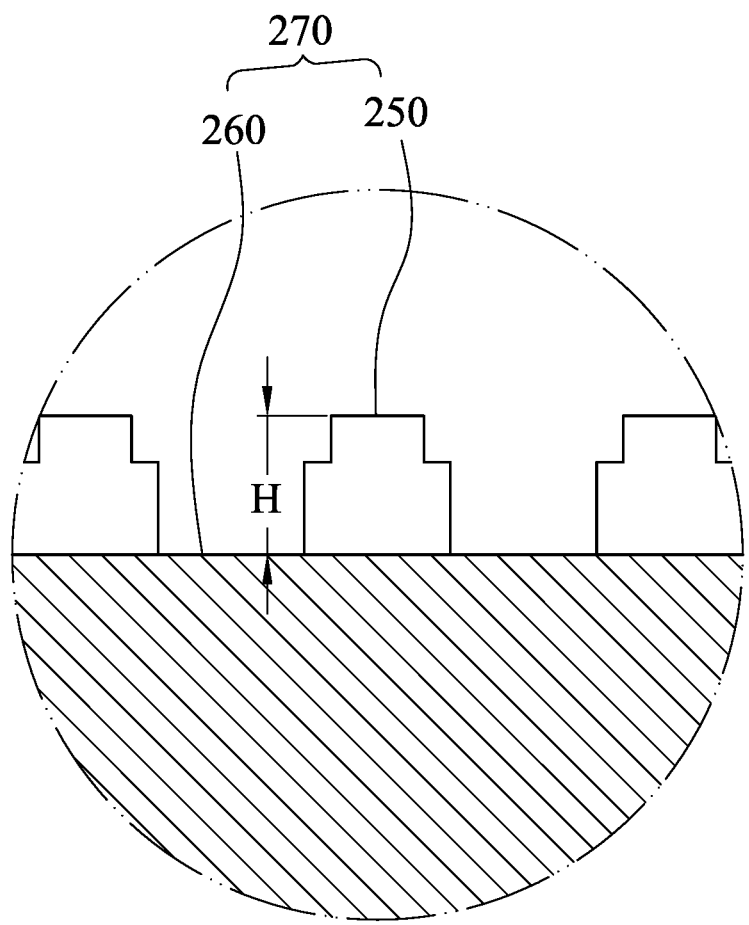
FIG. 2D is a cross-sectional view along line 2D-2D of FIG. 2C.

FIG. 2C is an enlarged view of part 2C in FIG. 2A. FIG. 2D is a cross-sectional view along line 2D-2D of FIG. 2C, and also a cross-sectional view of each of a plurality of the protrusion circles 270 of the inner annular surface 240. In FIG. 2A, FIG. 2C and FIG. 2D, the inner annular surface 240 includes the protrusion circles 270 surrounding the central axis z and arranged along a direction from the first side surface 210 towards the second side surface 220. Each of the protrusion circles 270 includes a plurality of protrusion structures 250 and a plurality of separation structures 260, and the protrusion structures 250 and the separation structures 260 of each of the protrusion circles 270 are alternately arranged to surround the central axis z. That is, between any two protrusion structures 250 closest to each other of each of the protrusion circles 270 is one of the separation structures 260, and between any two separation structures 260 closest to each other of each of the protrusion circles 270 is one of the protrusion structures 250.

In FIG. 2A and FIG. 2B, the annular optical element 200 with the protrusion structures 250 is formed integrally. The annular optical element 200 is made of a black plastic material and formed by an injection molding method. The outer annular surface 230 of the annular optical element 200 includes two gate traces 233 symmetrically located around the central axis z.

Each of the protrusion structures 250 of one of the protrusion circles 270 and one of the separation structures 260 of another of the protrusion circles 270 adjacent to the one protrusion circle 270 are aligned in the direction from the first side surface 210 towards the second side surface 220. Numbers of the protrusion structures 250 of all of the protrusion circles 270 are equal.

In FIG. 2C, the protrusion circles 270 of the inner annular surface 240 in the 2nd embodiment are composed of a plurality of odd-numbered protrusion circles 277 and a plurality of even-numbered protrusion circles 278. The odd-numbered protrusion circles 277 and the even-numbered protrusion circles 278 are alternately arranged along the direction from the first side surface 210 towards the second side surface 220. That is, one of the odd-numbered protrusion circles 277 and one of the even-numbered protrusion circles 278 are adjacent to each other. Furthermore, each of the protrusion structures 250 of one of the odd-numbered protrusion circles 277 and one of the separation structures 260 of one of the even-numbered protrusion circles 278 adjacent to the one odd-numbered protrusion circle 277 are aligned in the direction from the first side surface 210 towards the second side surface 220. Each of the protrusion structures 250 of one of the even-numbered protrusion circles 278 and one of the separation structures 260 of one of the odd-numbered protrusion circles 277 adjacent to the one even-numbered protrusion circle 278 are aligned in the direction from the first side surface 210 towards the second side surface 220. One of the protrusion structures 250 of every of the odd-numbered protrusion circles 277 and one of the separation structures 260 of every of the even-numbered protrusion circles 278 are alternately arranged along the direction from the first side surface 210 towards the second side surface 220. One of the separation structures 260 of every of the odd-numbered protrusion circles 277 and one of the protrusion structures 250 of every of the even-numbered protrusion circles 278 are alternately arranged along the direction from the first side surface 210 towards the second side surface 220.

Centers of all the protrusion circles 270 are respectively located on various points of the central axis z. A direction from the first side surface 210 towards the second side surface 220 of each of the protrusion structures 250 is orthogonal to all the protrusion circles 270. A bottom cross-section of each of the protrusion structures 250 is isosceles quadrilateral, and isosceles trapezoid in detail. Due to each of the protrusion structures 250 is located on the inner annular surface 240, two parallel sides of the bottom cross-section of each of the protrusion structures 250 can be featured with arc or curve.

Each of the separation structures 260 is isosceles quadrilateral, and isosceles trapezoid in detail. Due to each of the separation structures 260 is located on the inner annular surface 240, two parallel sides of each of the separation structures 260 can be featured with arc or curve.

In the 2nd embodiment, all the protrusion structures 250 of one of the odd-numbered protrusion circles 277 have the same values of the parameter Δd shown as the lower right in FIG. 2C, and all the protrusion structures 250 of one of the even-numbered protrusion circles 278 have the same values of the parameter Δd shown as the upper left in FIG. 2C. Furthermore, all values of the parameter Δd of the odd-numbered protrusion circles 277 and the even-numbered protrusion circles 278 are approximate. Along with the protrusion circles 270 one by one arranged from the second side surface 220 towards the first side surface 210, the circumferences of the protrusion circles 270 are slightly smaller and smaller one by one, the values of the parameter Δd are slightly smaller and smaller, and the protrusion structures 250 are arranged more densely and more densely.

All the protrusion structures 250 of all the odd-numbered protrusion circles 277 have the same values of the parameter Δr shown as the lower right in FIG. 2C, and all the protrusion structures 250 of all the even-numbered protrusion circles 278 have the same values of the parameter Δr shown as the upper left in FIG. 2C. Furthermore, all values of the parameter Δr of all the odd-numbered protrusion circles 277 and all the even-numbered protrusion circles 278 are the same.

In FIG. 2D, each of the protrusion structures 250 is a two-step structure. All the protrusion structures 250 have the same structures with approximate dimensions. Along with the protrusion circles 270 one by one arranged from the second side surface 220 towards the first side surface 210, the dimensions of the protrusion structures 250 are slightly smaller and smaller.

Figure 2E:
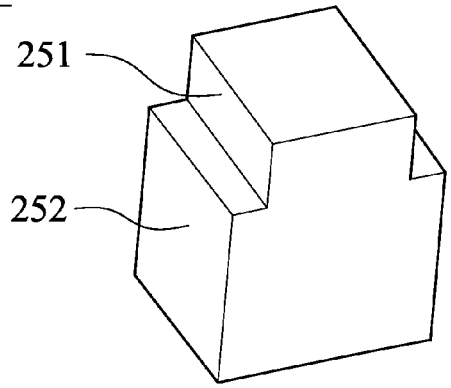
FIG. 2E is a three-dimensional view of the protrusion structure according to the 2nd embodiment.
Figure 2F:
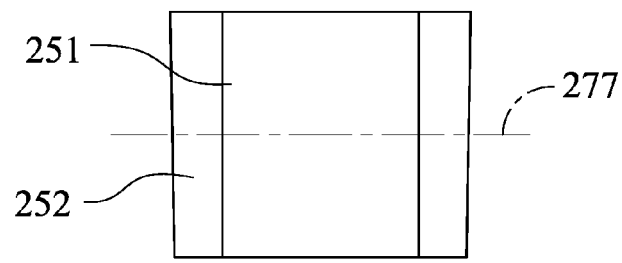
FIG. 2F is a plane view of the protrusion structure according to the 2nd embodiment.
Figure 2G:
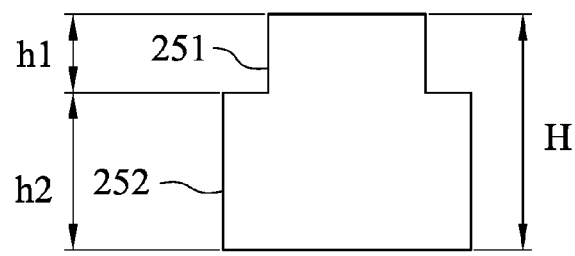
FIG. 2G is a side view of the protrusion structure according to the 2nd embodiment.

FIG. 2E is a three-dimensional view of the protrusion structure 250 according to the 2nd embodiment, FIG. 2F is a plane view of the protrusion structure 250 according to the 2nd embodiment, and FIG. 2G is a side view of the protrusion structure 250 according to the 2nd embodiment. It shown in FIG. 2F is also a plane view of each of the protrusion structures 250 of the odd-numbered protrusion circles 277 in FIG. 2C and a plane view of each of the protrusion structures 250 of the even-numbered protrusion circles 278 in FIG. 2C. In FIG. 2E to FIG. 2G, each of the protrusion structures 250 includes a first step structure 251 and a second step structure 252, wherein the first step structure 251 is farther from the bottom cross-section of the protrusion structure 250 than the second step structure 252 is from the bottom cross-section of the protrusion structure 250. In detail, the first step structure 251 is recessed relative to the second step structure 252 in the circumferential direction of the protrusion circle 270.

In FIG. 2A, when a number of the protrusion structures 250 of the annular optical element 200 is N, the following condition is satisfied: $420<N<2000$. Preferably, the following condition can be satisfied: $650<N<1500$.

The data of the parameters 10×A, H, h1, h2, h1+h2, h1/h2, d, Δr and Δd/Δr of the annular optical element 200 according to the 2nd embodiment of the present disclosure are listed in the following Table 2, wherein the parameters are also shown as FIG. 2C, FIG. 2D and FIG. 2G. The definitions of these parameters shown in Table 2 are the same as those stated in the annular optical element 100 of the 1st embodiment with corresponding values for the annular optical element 200.

TABLE 2

| 2nd Embodiment | | | |
|---|---|---|---|
| 10 × A (mm$^2$) | 0.0189 | h1/h2 | 0.500 |
| H (mm) | 0.06 | Δd (mm) | 0.12 |
| h1 (mm) | 0.02 | Δr (mm) | 0.08 |
| h2 (mm) | 0.04 | Δd/Δr | 1.50 |
| h1 + h2 (mm) | 0.06 | | |

3rd Embodiment

Figure 3A:
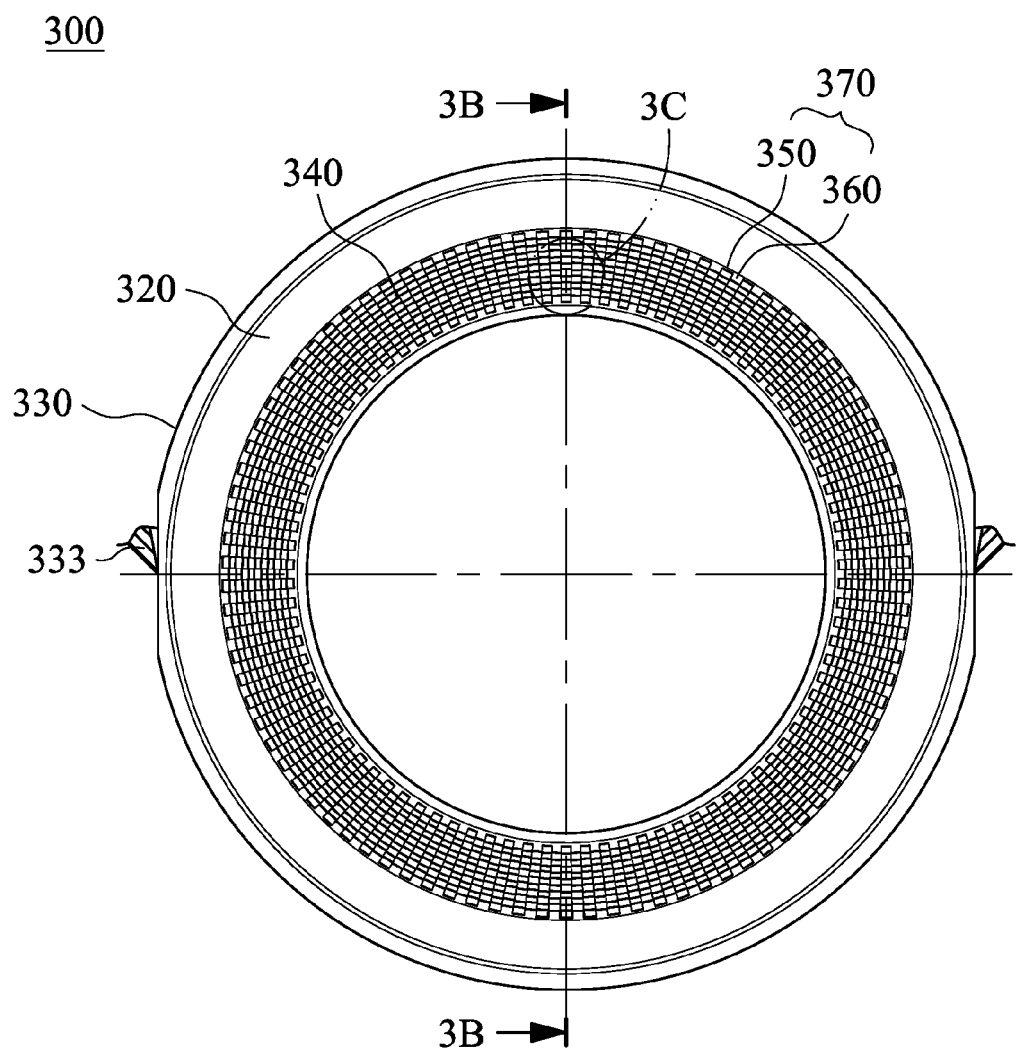
FIG. 3A is a schematic view of an annular optical element according to the 3rd embodiment of the present disclosure.
Figure 3B:
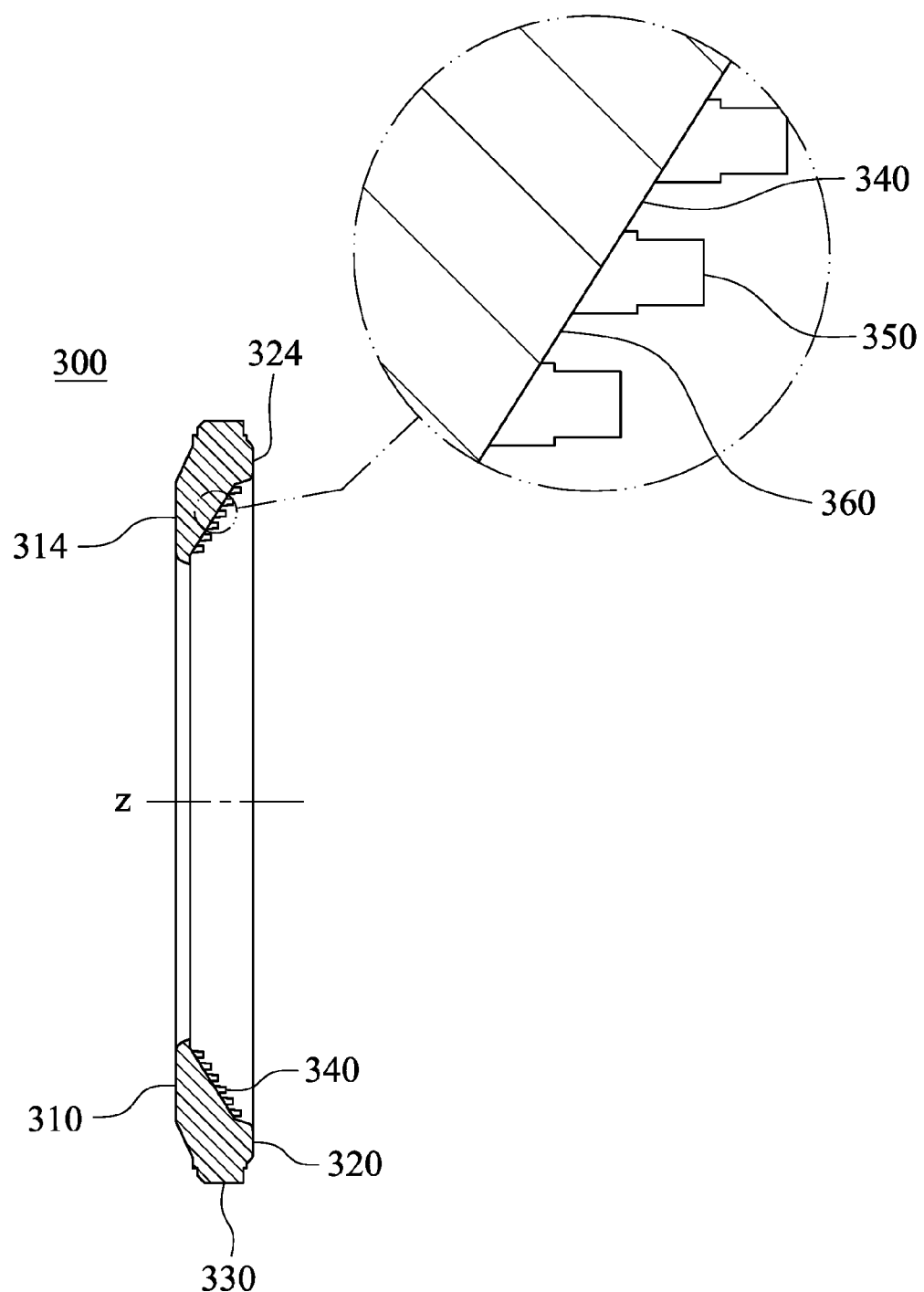
FIG. 3B is a cross-sectional view along line 3B-3B of FIG. 3A.

FIG. 3A is a schematic view of an annular optical element 300 according to the 3rd embodiment of the present disclosure, and FIG. 3B is a cross-sectional view along line 3B-3B of FIG. 3A. In FIG. 3A and FIG. 3B, the annular optical element 300 includes a first side surface 310, a second side surface 320, an outer annular surface 330 and an inner annular surface 340. The second side surface 320 is located correspondingly to the first side surface 310. The outer annular surface 330 connects the first side surface 310 and the second side surface 320, and surrounds a central axis z of the annular optical element 300. The inner annular surface 340 connects the first side surface 310 and the second side surface 320, surrounds the central axis z, and is closer to the central axis z than the outer annular surface 330 is to the central axis z. In the 3rd embodiment, the first side surface 310 and the second side surface 320 respectively include receiving surfaces 314 and 324, which are both flat surfaces orthogonal to the central axis z.

Figure 3C:
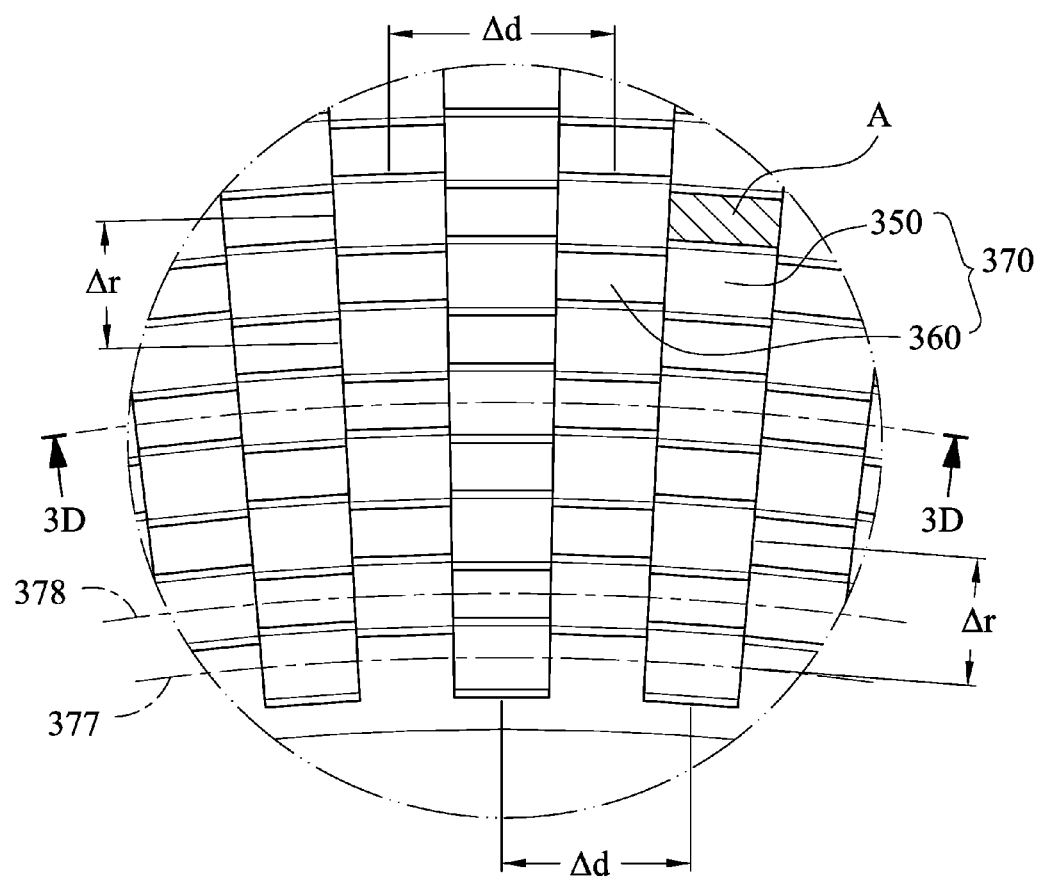
FIG. 3C is an enlarged view of part 3C in FIG. 3A.
Figure 3D:
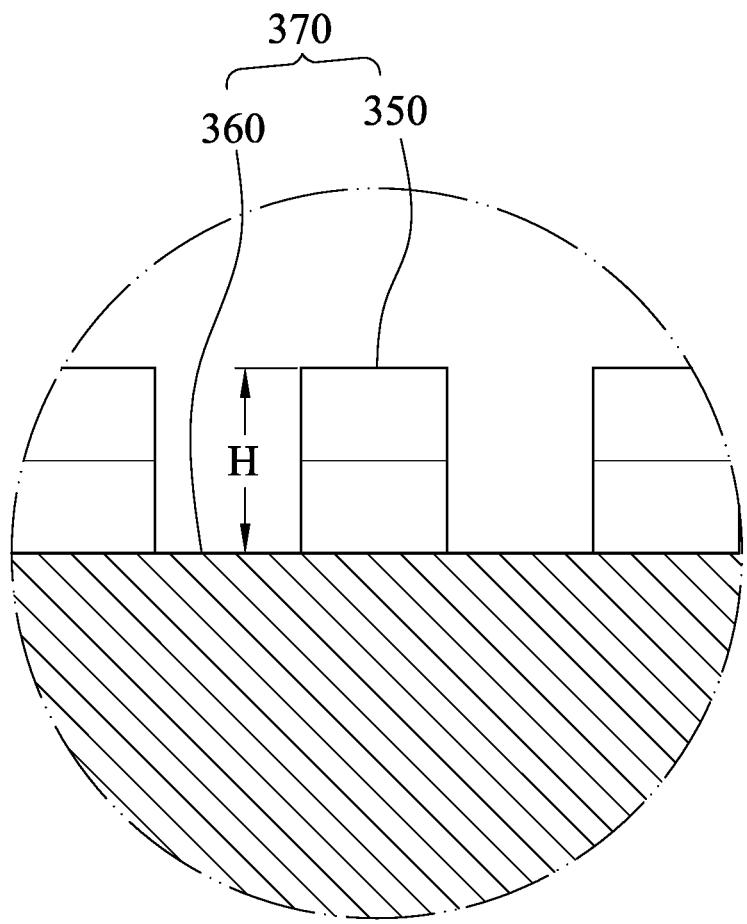
FIG. 3D is a cross-sectional view along line 3D-3D of FIG. 3C.

FIG. 3C is an enlarged view of part 3C in FIG. 3A. FIG. 3D is a cross-sectional view along line 3D-3D of FIG. 3C, and also a cross-sectional view of each of a plurality of the protrusion circles 370 of the inner annular surface 340. In FIG. 3A, FIG. 3C and FIG. 3D, the inner annular surface 340 includes the protrusion circles 370 surrounding the central axis z and arranged along a direction from the first side surface 310 towards the second side surface 320. Each of the protrusion circles 370 includes a plurality of protrusion structures 350 and a plurality of separation structures 360, and the protrusion structures 350 and the separation structures 360 of each of the protrusion circles 370 are alternately arranged to surround the central axis z. That is, between any two protrusion structures 350 closest to each other of each of the protrusion circles 370 is one of the separation structures 360, and between any two separation structures 360 closest to each other of each of the protrusion circles 370 is one of the protrusion structures 350.

In FIG. 3A and FIG. 3B, the annular optical element 300 with the protrusion structures 350 is formed integrally. The annular optical element 300 is made of a black plastic material and formed by an injection molding method. The outer annular surface 330 of the annular optical element 300 includes two gate traces 333 symmetrically located around the central axis z.

Each of the protrusion structures 350 of one of the protrusion circles 370 and one of the separation structures 360 of another of the protrusion circles 370 adjacent to the one protrusion circle 370 are aligned in the direction from the first side surface 310 towards the second side surface 320. Numbers of the protrusion structures 350 of all of the protrusion circles 370 are equal.

In FIG. 3C, the protrusion circles 370 of the inner annular surface 340 in the 3rd embodiment are composed of a plurality of odd-numbered protrusion circles 377 and a plurality of even-numbered protrusion circles 378. The odd-numbered protrusion circles 377 and the even-numbered protrusion circles 378 are alternately arranged along the direction from the first side surface 310 towards the second side surface 320. That is, one of the odd-numbered protrusion circles 377 and one of the even-numbered protrusion circles 378 are adjacent to each other. Furthermore, each of the protrusion structures 350 of one of the odd-numbered protrusion circles 377 and one of the separation structures 360 of one of the even-numbered protrusion circles 378 adjacent to the one odd-numbered protrusion circle 377 are aligned in the direction from the first side surface 310 towards the second side surface 320. Each of the protrusion structures 350 of one of the even-numbered protrusion circles 378 and one of the separation structures 360 of one of the odd-numbered protrusion circles 377 adjacent to the one even-numbered protrusion circle 378 are aligned in the direction from the first side surface 310 towards the second side surface 320. One of the protrusion structures 350 of every of the odd-numbered protrusion circles 377 and one of the separation structures 360 of every of the even-numbered protrusion circles 378 are alternately arranged along the direction from the first side surface 310 towards the second side surface 320. One of the separation structures 360 of every of the odd-numbered protrusion circles 377 and one of the protrusion structures 350 of every of the even-numbered protrusion circles 378 are alternately arranged along the direction from the first side surface 310 towards the second side surface 320.

Centers of all the protrusion circles 370 are respectively located on various points of the central axis z. A direction from the first side surface 310 towards the second side surface 320 of each of the protrusion structures 350 is orthogonal to all the protrusion circles 370. A bottom cross-section of each of the protrusion structures 350 is isosceles quadrilateral, and isosceles trapezoid in detail. Due to each of the protrusion structures 350 is located on the inner annular surface 340, two parallel sides of the bottom cross-section of each of the protrusion structures 350 can be featured with arc or curve.

Each of the separation structures 360 is isosceles quadrilateral, and isosceles trapezoid in detail. Due to each of the separation structures 360 is located on the inner annular surface 340, two parallel sides of each of the separation structures 360 can be featured with arc or curve.

In the 3rd embodiment, all the protrusion structures 350 of one of the odd-numbered protrusion circles 377 have the same values of the parameter Δd shown as the lower right in FIG. 3C, and all the protrusion structures 350 of one of the even-numbered protrusion circles 378 have the same values of the parameter Δd shown as the upper left in FIG. 3C. Furthermore, all values of the parameter Δd of the odd-numbered protrusion circles 377 and the even-numbered protrusion circles 378 are approximate. Along with the protrusion circles 370 one by one arranged from the second side surface 320 towards the first side surface 310, the circumferences of the protrusion circles 370 are slightly smaller and smaller one by one, the values of the parameter Δd are slightly smaller and smaller, and the protrusion structures 350 are arranged more densely and more densely.

All the protrusion structures 350 of all the odd-numbered protrusion circles 377 have the same values of the parameter Δr shown as the lower right in FIG. 3C, and all the protrusion structures 350 of all the even-numbered protrusion circles 378 have the same values of the parameter Δr shown as the upper left in FIG. 3C. Furthermore, all values of the parameter Δr of all the odd-numbered protrusion circles 377 and all the even-numbered protrusion circles 378 are the same.

In FIG. 3B, each of the protrusion structures 350 is a two-step structure. All the protrusion structures 350 have the same structures with approximate dimensions. Along with the protrusion circles 370 one by one arranged from the second side surface 320 towards the first side surface 310, the dimensions of the protrusion structures 350 are slightly smaller and smaller.

Figure 3E:
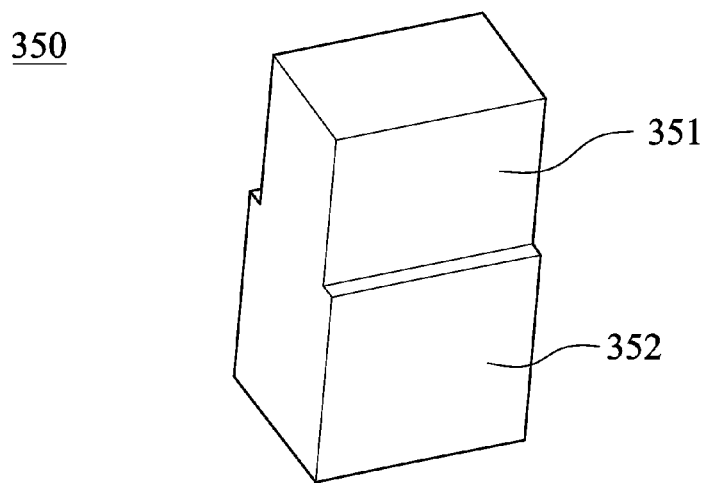
FIG. 3E is a three-dimensional view of the protrusion structure according to the 3rd embodiment.
Figure 3F:
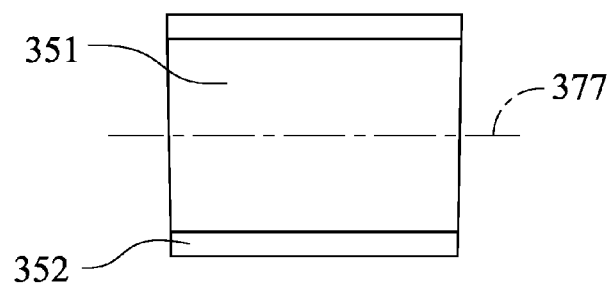
FIG. 3F is a plane view of the protrusion structure according to the 3rd embodiment.
Figure 3G:
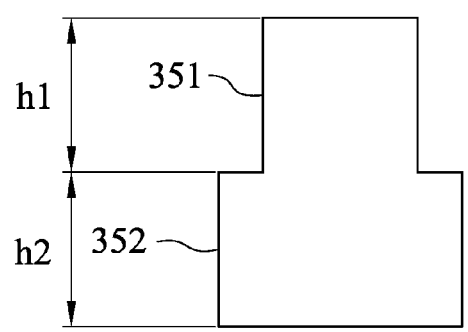
FIG. 3G is a side view of the protrusion structure according to the 3rd embodiment.

FIG. 3E is a three-dimensional view of the protrusion structure 350 according to the 3rd embodiment, FIG. 3F is a plane view of the protrusion structure 350 according to the 3rd embodiment, and FIG. 3G is a side view of the protrusion structure 350 according to the 3rd embodiment. It shown in FIG. 3F is also a plane view of each of the protrusion structures 350 of the odd-numbered protrusion circles 377 in FIG. 3C and a plane view of each of the protrusion structures 350 of the even-numbered protrusion circles 378 in FIG. 3C. In FIG. 3E to FIG. 3G, each of the protrusion structures 350 includes a first step structure 351 and a second step structure 352, wherein the first step structure 351 is farther from the bottom cross-section of the protrusion structure 350 than the second step structure 352 is from the bottom cross-section of the protrusion structure 350. In detail, the first step structure 351 is recessed relative to the second step structure 352 in the direction from the first side surface 310 towards the second side surface 320.

In FIG. 3A, when a number of the protrusion structures 350 of the annular optical element 300 is N, the following condition is satisfied: 420<N<2000. Preferably, the following condition can be satisfied: 650<N<1500.

The data of the parameters 10×A, H, h1, h2, h1+h2, h1/h2, Δd, Δr and Δd/Δr of the annular optical element 300 according to the 3rd embodiment of the present disclosure are listed in the following Table 3, wherein the parameters are also shown as FIG. 3C, FIG. 3D and FIG. 3G. The definitions of is these parameters shown in Table 3 are the same as those stated in the annular optical element 100 of the 1st embodiment with corresponding values for the annular optical element 300.

TABLE 3

| 3rd Embodiment | | | |
|---|---|---|---|
| 10 × A (mm²) | 0.0189 | h1/h2 | 1.000 |
| H (mm) | 0.08 | Δd (mm) | 0.12 |
| h1 (mm) | 0.04 | Δr (mm) | 0.08 |
| h2 (mm) | 0.04 | Δd/Δr | 1.50 |
| h1 + h2 (mm) | 0.08 | | |

4th Embodiment

Figure 4A:
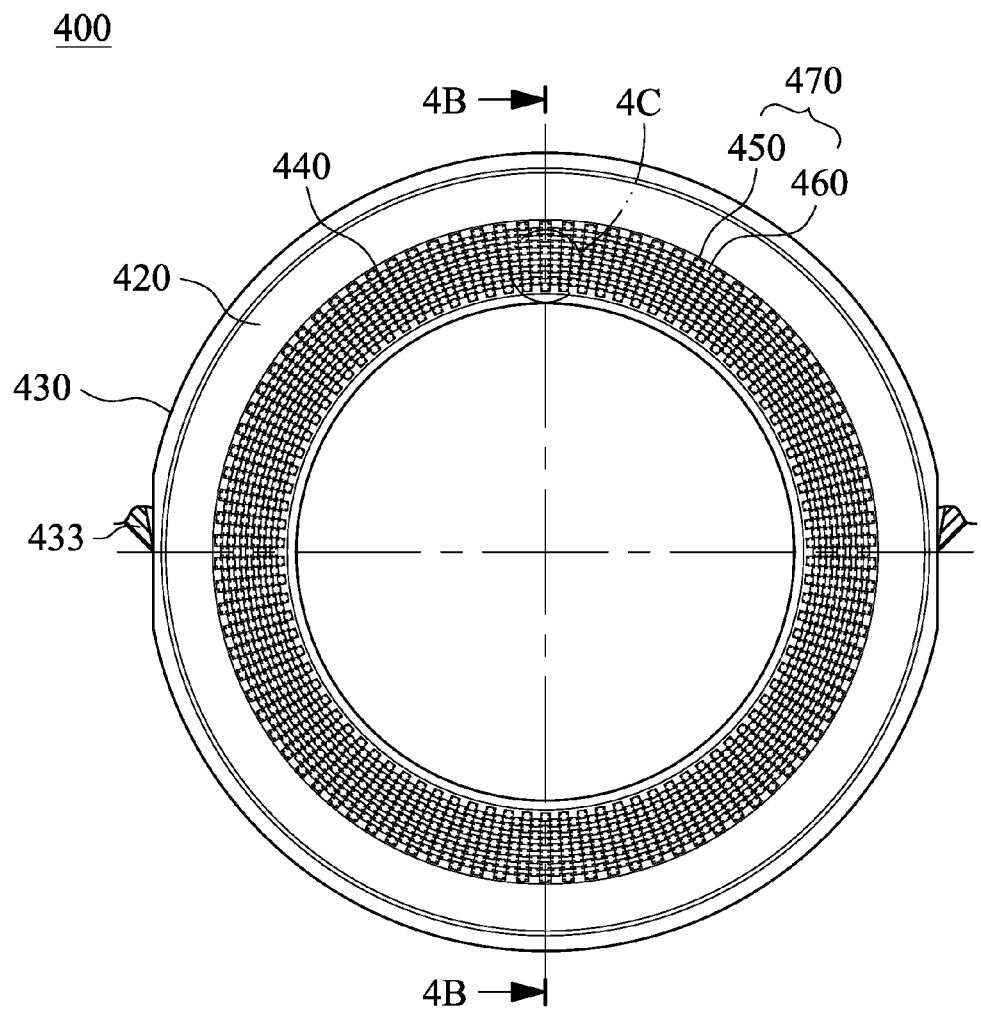
FIG. 4A is a schematic view of an annular optical element according to the 4th embodiment of the present disclosure.
Figure 4B:
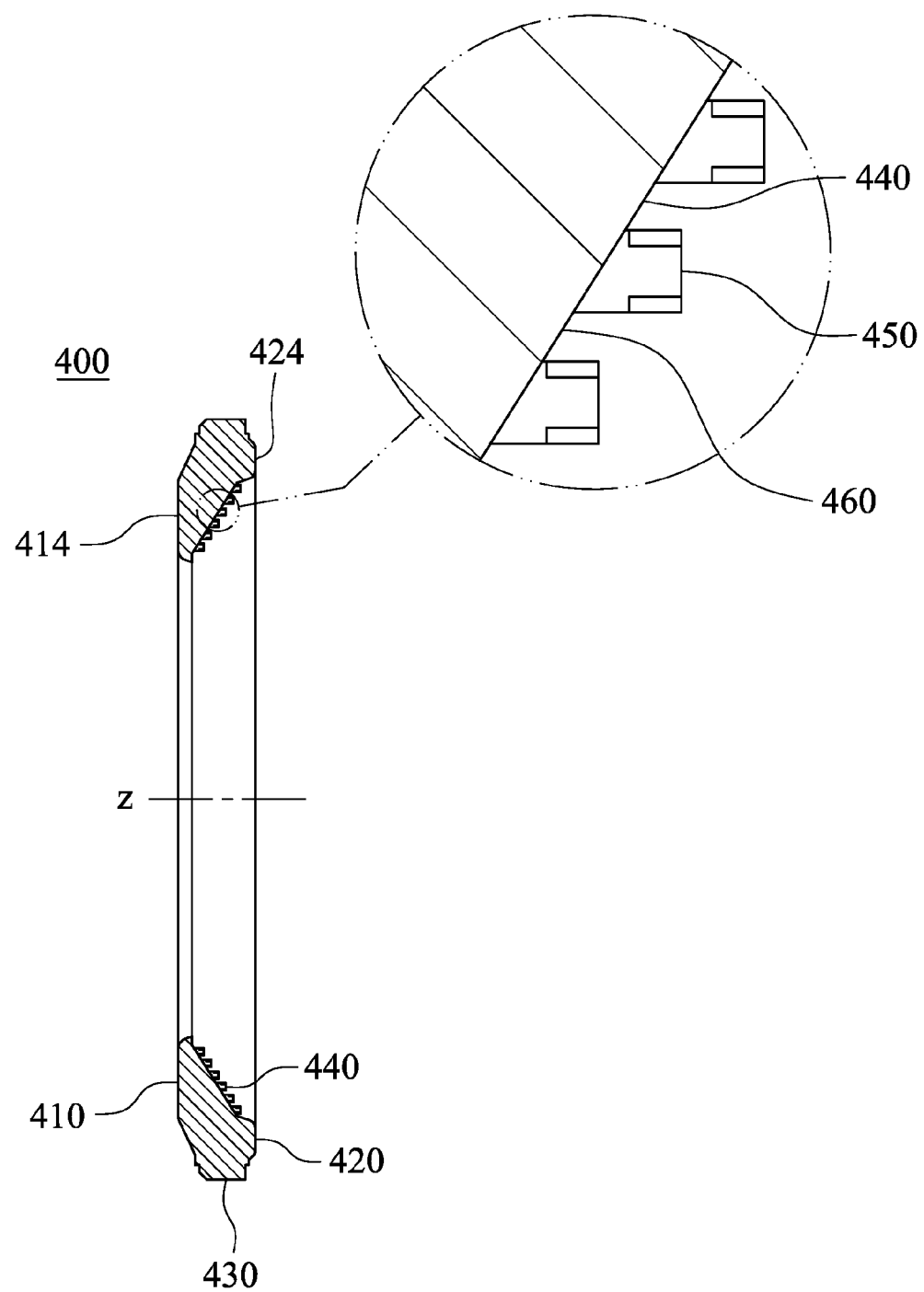
FIG. 4B is a cross-sectional view along line 4B-4B of FIG. 4A.

FIG. 4A is a schematic view of an annular optical element 400 according to the 4th embodiment of the present disclosure, and FIG. 4B is a cross-sectional view along line 4B-4B of FIG. 4A. In FIG. 4A and FIG. 4B, the annular optical element 400 includes a first side surface 410, a second side surface 420, an outer annular surface 430 and an inner annular surface 440. The second side surface 420 is located correspondingly to the first side surface 410. The outer annular surface 430 connects the first side surface 410 and the second side surface 420, and surrounds a central axis z of the annular optical element 400. The inner annular surface 440 connects the first side surface 410 and the second side surface 420, surrounds the central axis z, and is closer to the central axis z than the outer annular surface 430 is to the central axis z. In the 4th embodiment, the first side surface 410 and the second side surface 420 respectively include receiving surfaces 414 and 424, which are both flat surfaces orthogonal to the central axis z.

Figure 4C:
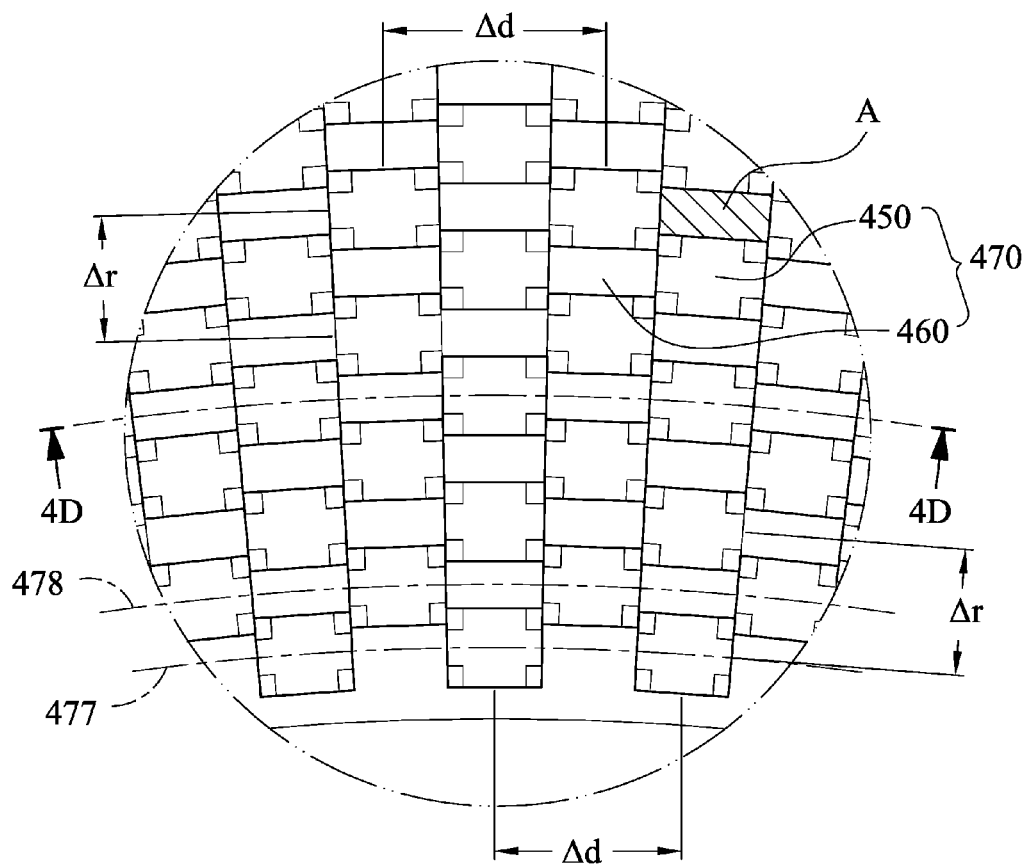
FIG. 4C is an enlarged view of part 4C in FIG. 4A.
Figure 4D:
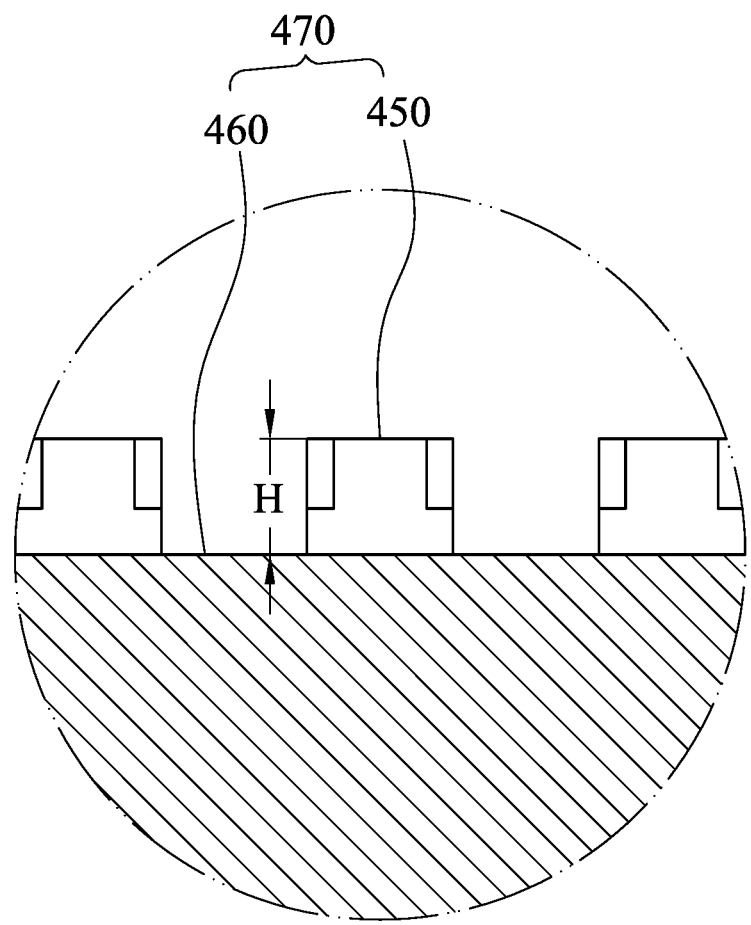
FIG. 4D is a cross-sectional view along line 4D-4D of FIG. 4C.

FIG. 4C is an enlarged view of part 4C in FIG. 4A. FIG. 4D is a cross-sectional view along line 4D-4D of FIG. 4C, and also a cross-sectional view of each of a plurality of the protrusion circles 470 of the inner annular surface 440. In FIG. 4A, FIG. 4C and FIG. 4D, the inner annular surface 440 includes the protrusion circles 470 surrounding the central axis z and arranged along a direction from the first side surface 410 towards the second side surface 420. Each of the protrusion circles 470 includes a plurality of protrusion structures 450 and a plurality of separation structures 460, and the protrusion structures 450 and the separation structures 460 of each of the protrusion circles 470 are alternately arranged to surround the central axis z. That is, between any two protrusion structures 450 closest to each other of each of the protrusion circles 470 is one of the separation structures 460, and between any two separation structures 460 closest to each other of each of the protrusion circles 470 is one of the protrusion structures 450.

In FIG. 4A and FIG. 4B, the annular optical element 400 with the protrusion structures 450 is formed integrally. The annular optical element 400 is made of a black plastic material and formed by an injection molding method. The outer annular surface 430 of the annular optical element 400 includes two gate traces 433 symmetrically located around the central axis z.

Each of the protrusion structures 450 of one of the protrusion circles 470 and one of the separation structures 460 of another of the protrusion circles 470 adjacent to the one protrusion circle 470 are aligned in the direction from the first side surface 410 towards the second side surface 420. Numbers of the protrusion structures 450 of all of the protrusion circles 470 are equal.

In FIG. 4C, the protrusion circles 470 of the inner annular surface 440 in the 4th embodiment are composed of a plurality of odd-numbered protrusion circles 477 and a plurality of even-numbered protrusion circles 478. The odd-numbered protrusion circles 477 and the even-numbered protrusion circles 478 are alternately arranged along the direction from the first side surface 410 towards the second side surface 420. That is, one of the odd-numbered protrusion circles 477 and one of the even-numbered protrusion circles 478 are adjacent to each other. Furthermore, each of the protrusion structures 450 of one of the odd-numbered protrusion circles 477 and one of the separation structures 460 of one of the even-numbered protrusion circles 478 adjacent to the one odd-numbered protrusion circle 477 are aligned in the direction from the first side surface 410 towards the second side surface 420. Each of the protrusion structures 450 of one of the even-numbered protrusion circles 478 and one of the separation structures 460 of one of the odd-numbered protrusion circles 477 adjacent to the one even-numbered protrusion circle 478 are aligned in the direction from the first side surface 410 towards the second side surface 420. One of the protrusion structures 450 of every of the odd-numbered protrusion circles 477 and one of the separation structures 460 of every of the even-numbered protrusion circles 478 are alternately arranged along the direction from the first side surface 410 towards the second side surface 420. One of the separation structures 460 of every of the odd-numbered protrusion circles 477 and one of the protrusion structures 450 of every of the even-numbered protrusion circles 478 are alternately arranged along the direction from the first side surface 410 towards the second side surface 420.

Centers of all the protrusion circles 470 are respectively located on various points of the central axis z. A direction from the first side surface 410 towards the second side surface 420 of each of the protrusion structures 450 is orthogonal to all the protrusion circles 470. A bottom cross-section of each of the protrusion structures 450 is isosceles quadrilateral, and isosceles trapezoid in detail. Due to each of the protrusion structures 450 is located on the inner annular surface 440, two parallel sides of the bottom cross-section of each of the protrusion structures 450 can be featured with arc or curve.

Each of the separation structures 460 is isosceles quadrilateral, and isosceles trapezoid in detail. Due to each of the separation structures 460 is located on the inner annular surface 440, two parallel sides of each of the separation structures 460 can be featured with arc or curve.

In the 4th embodiment, all the protrusion structures 450 of one of the odd-numbered protrusion circles 477 have the same values of the parameter Δd shown as the lower right in FIG. 4C, and all the protrusion structures 450 of one of the even-numbered protrusion circles 478 have the same values of the parameter Δd shown as the upper left in FIG. 4C. Furthermore, all values of the parameter Δd of the odd-numbered protrusion circles 477 and the even-numbered protrusion circles 478 are approximate. Along with the protrusion circles 470 one by one arranged from the second side surface 420 towards the first side surface 410, the circumferences of the protrusion circles 470 are slightly smaller and smaller one by one, the values of the parameter Δd are slightly smaller and smaller, and the protrusion structures 450 are arranged more densely and more densely.

All the protrusion structures 450 of all the odd-numbered protrusion circles 477 have the same values of the parameter Δr shown as the lower right in FIG. 4C, and all the protrusion structures 450 of all the even-numbered protrusion circles 478 have the same values of the parameter Δr shown as the upper left in FIG. 4C. Furthermore, all values of the parameter Δr of all the odd-numbered protrusion circles 477 and all the even-numbered protrusion circles 478 are the same.

In FIG. 4D, each of the protrusion structures 450 is a two-step structure. All the protrusion structures 450 have the same structures with approximate dimensions. Along with the protrusion circles 470 one by one arranged from the second side surface 420 towards the first side surface 410, the dimensions of the protrusion structures 450 are slightly smaller and smaller.

Figure 4E:
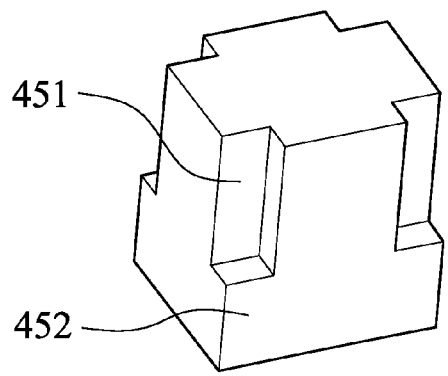
FIG. 4E is a three-dimensional view of the protrusion structure according to the 4th embodiment.
Figure 4F:
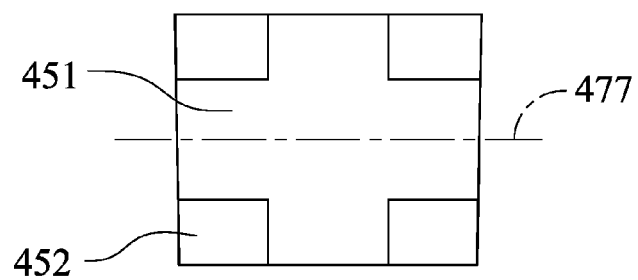
FIG. 4F is a plane view of the protrusion structure according to the 4th embodiment.
Figure 4G:
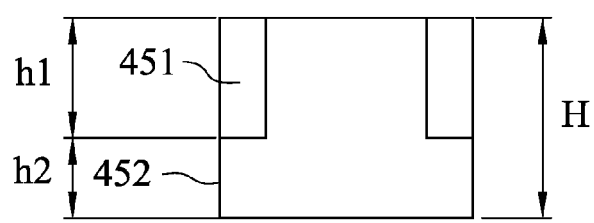
FIG. 4G is a side view of the protrusion structure according to the 4th embodiment.

FIG. 4E is a three-dimensional view of the protrusion structure 450 according to the 4th embodiment, FIG. 4F is a plane view of the protrusion structure 450 according to the 4th embodiment, and FIG. 4G is a side view of the protrusion structure 450 according to the 4th embodiment. It shown in FIG. 4F is also a plane view of each of the protrusion structures 450 of the odd-numbered protrusion circles 477 in FIG. 4C and a plane view of each of the protrusion structures 450 of the even-numbered protrusion circles 478 in FIG. 4C. In FIG. 4E to FIG. 4G, each of the protrusion structures 450 includes a first step structure 451 and a second step structure 452, wherein the first step structure 451 is farther from the bottom cross-section of the protrusion structure 450 than the second step structure 452 is from the bottom cross-section of the protrusion structure 450. In detail, the first step structure 451 is recessed relative to the second step structure 452 at four corners of the protrusion structure 450.

In FIG. 4A, when a number of the protrusion structures 450 of the annular optical element 400 is N, the following condition is satisfied: 420<N<2000. Preferably, the following condition can be satisfied: 650<N<1500.

The data of the parameters 10×A, H, h1, h2, h1+h2, h1/h2, Δd, Δr and Δd/Δr of the annular optical element 400 according to the 4th embodiment of the present disclosure are listed in the following Table 4, wherein the parameters are also shown as FIG. 4C, FIG. 4D and FIG. 4G. The definitions of these parameters shown in Table 4 are the same as those stated in the annular optical element 100 of the 1st embodiment with corresponding values for the annular optical element 400.

TABLE 4

| 4th Embodiment | | | |
|---|---|---|---|
| 10 × A (mm²) | 0.0189 | h1/h2 | 1.500 |
| H (mm) | 0.05 | Δd (mm) | 0.12 |
| h1 (mm) | 0.03 | Δr (mm) | 0.08 |
| h2 (mm) | 0.02 | Δd/Δr | 1.50 |
| h1 + h2 (mm) | 0.05 | | |

5th Embodiment

Figure 5:
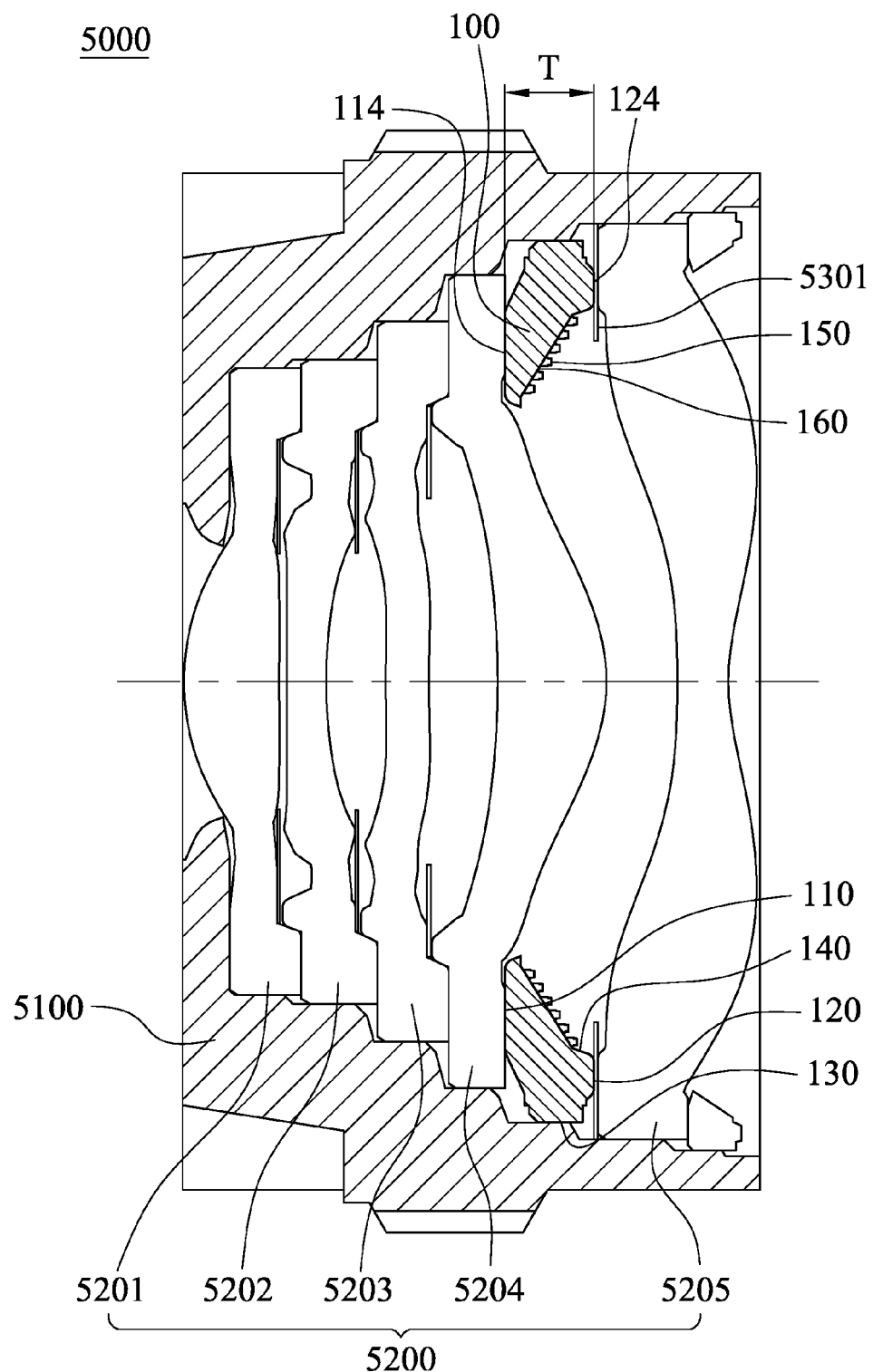
FIG. 5 is a schematic view of an imaging lens assembly according to the 5th embodiment of the present disclosure.

FIG. 5 is a schematic view of an imaging lens assembly 5000 according to the 5th embodiment of the present disclosure. In FIG. 5, the imaging lens assembly 5000 includes a barrel 5100, a lens set 5200 and the annular optical element 100 in the aforementioned 1st embodiment, wherein the lens set 5200 and the annular optical element 100 are both disposed in the barrel 5100. The lens set 5200 includes a plurality of lens elements (5201-5205). In the 5th embodiment, the receiving surface 114 of the annular optical element 100 is connected to the lens element 5204.

In FIG. 1A to FIG. 1C and FIG. 5, the annular optical element 100 includes the first side surface 110, the second side surface 120, the outer annular surface 130 and the inner annular surface 140. The second side surface 120 is located correspondingly to the first side surface 110, and farther from an imaged object (not shown herein) than the first side surface 110 is from the imaged object. The outer annular surface 130 connects the first side surface 110 and the second side surface 120, and surrounds the central axis z of the annular optical element 100 (i.e. an optical axis of the imaging lens assembly 5000). The inner annular surface 140 connects the first side surface 110 and the second side surface 120, surrounds the central axis z, and is closer to the central axis z than the outer annular surface 130 is to the central axis z. The inner annular surface 140 includes the protrusion circles 170 surrounding the central axis z and arranged along the direction from the first side surface 110 towards the second side surface 120. Each of the protrusion circles 170 includes the protrusion structures 150 and the separation structures 160, and the protrusion structures 150 and the separation structures 160 of each of the protrusion circles 170 are alternately arranged to surround the central axis z.

In FIG. 1D and FIG. 5, when a greatest distance between the first side surface 110 and the second side surface 120 is T, and the height difference between each of the protrusion structures 150 and one of the separation structures 160 adjacent to thereof of each of the protrusion circles 170 is H, the following condition is satisfied: 3.0<T/H<31.0. Therefore, the height difference between each of the protrusion structures 150 and one of the separation structures 160 would be more apparent to further effectively attenuate the reflection of the stray light in the imaging lens assembly 5000. The other details of the annular optical element 100 have been described in the foregoing paragraphs of the 1st embodiment and will not be described again herein.

In detail, in FIG. 1D, when the height difference between each of the protrusion structures 150 and one of the separation structures 160 adjacent to thereof of each of the protrusion circles 170 is H, the following condition can be satisfied: 0.02 mm<H<0.20 mm. Therefore, it is favorable for effectively attenuating the stray light reflected from the annular optical element 100, so that the image quality of the imaging lens assembly 5000 can be enhanced, and the production efficiency can be raised.

In FIG. 1A, the outer annular surface 130 of the annular optical element 100 can include at least two gate traces 133 formed by the injection molding method and symmetrically located around the central axis z. Therefore, it is favorable for maintaining the structural integrity of the annular optical element 100 after injection molding. In the 5th embodiment, the outer annular surface 130 includes two gate traces 133 symmetrically located around the central axis z.

In FIG. 1A and FIG. 1C, each of the protrusion structures 150 of one of the protrusion circles 170 and one of the separation structures 160 of another of the protrusion circles 170 adjacent to the one protrusion circle 170 can be aligned in the direction from the first side surface 110 towards the second side surface 120. Therefore, it is favorable for increasing the machining smoothness of the annular optical element 100. Numbers of the protrusion structures 150 of all of the protrusion circles 170 can be equal. In the 5th embodiment, each of the protrusion structures 150 of one of the protrusion circles 170 and one of the separation structures 160 of another of the protrusion circles 170 adjacent to the one protrusion circle 170 are aligned in the direction from the first side surface 110 towards the second side surface 120. Numbers of the protrusion structures 150 of all of the protrusion circles 170 are equal.

In FIG. 1C and FIG. 1E, the bottom cross-section of each of the protrusion structures 150 can be quadrilateral. Therefore, it is favorable for reducing the light reflected from the annular optical element 100. In the 5th embodiment, the bottom cross-section of each of the protrusion structures 150 is isosceles quadrilateral, and isosceles trapezoid in detail.

In FIG. 1B, FIG. 1D and FIG. 1E, each of the protrusion structures 150 can be the two-step structure. Therefore, the protrusion structures 150 of the annular optical element 100 are finer to enhance the effect of attenuating the stray light in the imaging lens assembly 5000. In the 5th embodiment, each of the protrusion structures 150 is the two-step structure.

In FIG. 1A and FIG. 1E, when the number of the protrusion structures 150 of the annular optical element 100 is N, the following condition can be satisfied: 420<N<2000. Therefore, it is favorable for balancing the manufacturability of the annular optical element 100 and the denseness of the protrusion structures 150.

Furthermore, in FIG. 5, the lens set 5200 includes the lens elements 5201, 5202, 5203, 5204 and 5205 in order from a side near the imaged object to a side near an image surface (not shown herein). In addition, the imaging lens assembly 5000 further includes the annular optical element 100 and other optical elements (their reference numerals are omitted) such as spacers, light blocking sheets and etc., wherein the lens elements 5201-5205 are respectively abutted with the aforementioned optical elements (including the annular optical element 100) to be disposed in the plastic barrel 5100. The receiving surface 114 of the first side surface 110 is abutted with the lens element 5204, and the receiving surface 124 of the second side surface 120 is abutted with a light blocking sheet 5301.

The data of the aforementioned parameters of the imaging lens assembly 5000 according to the 5th embodiment of the present disclosure are listed in the following Table 5, wherein the parameters are also shown as FIG. 1D and FIG. 5.

TABLE 5

| 5th Embodiment | | | |
|---|---|---|---|
| H (mm) | 0.05 | T/H | 10.50 |
| T (mm) | 0.525 | | |

6th Embodiment

Figure 6:
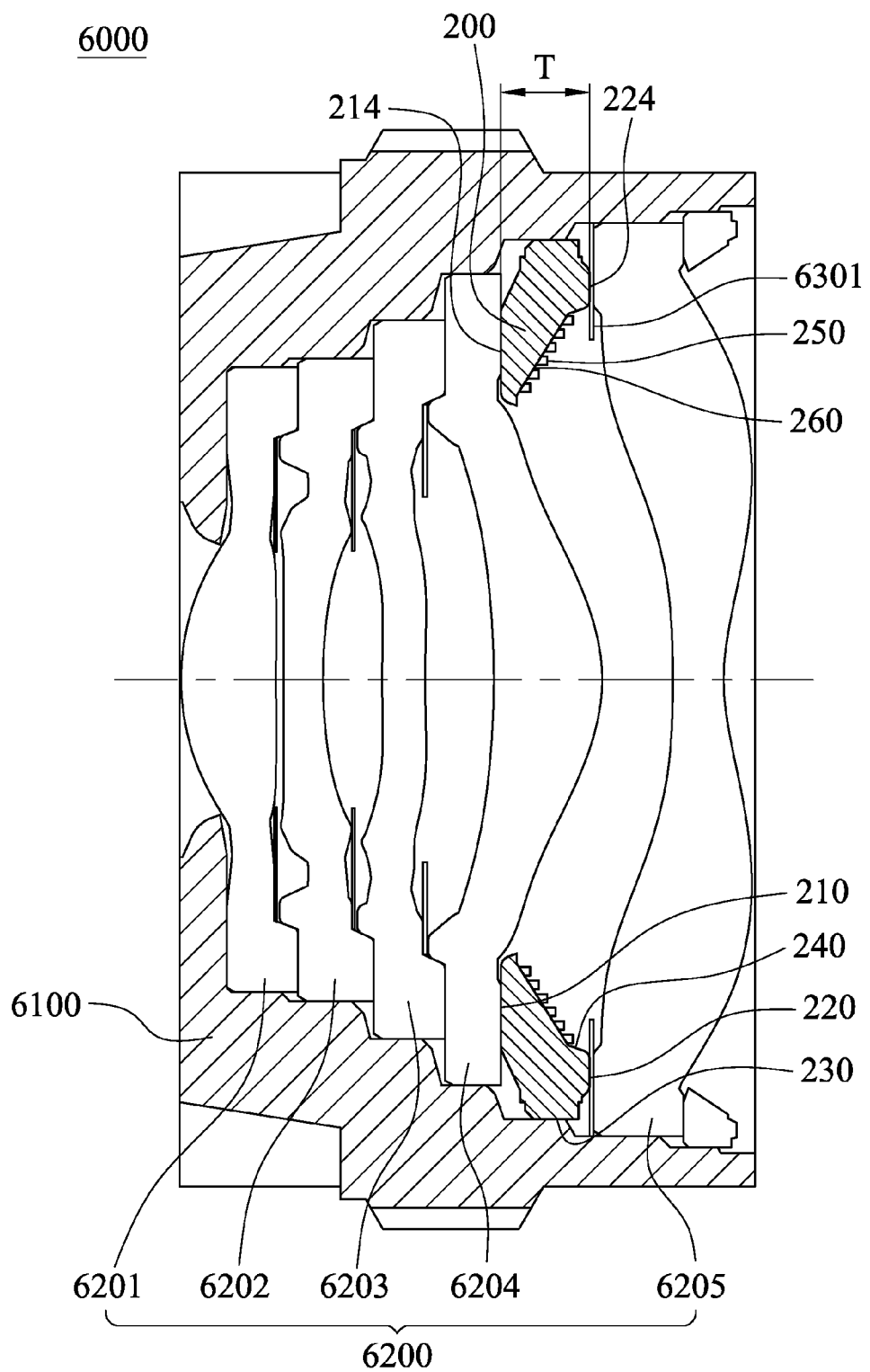
FIG. 6 is a schematic view of an imaging lens assembly according to the 6th embodiment of the present disclosure.

FIG. 6 is a schematic view of an imaging lens assembly 6000 according to the 6th embodiment of the present disclosure. In FIG. 6, the imaging lens assembly 6000 includes a barrel 6100, a lens set 6200 and the annular optical element 200 in the aforementioned 2nd embodiment, wherein the lens set 6200 and the annular optical element 200 are both disposed in the barrel 6100. The lens set 6200 includes a plurality of lens elements (6201-6205). In the 6th embodiment, the receiving surface 214 of the annular optical element 200 is connected to the lens element 6204.

In FIG. 2A to FIG. 2C and FIG. 6, the annular optical element 200 includes the first side surface 210, the second side surface 220, the outer annular surface 230 and the inner annular surface 240. The second side surface 220 is located correspondingly to the first side surface 210, and farther from an imaged object (not shown herein) than the first side surface 210 is from the imaged object. The outer annular surface 230 connects the first side surface 210 and the second side surface 220, and surrounds the central axis z of the annular optical element 200 (i.e. an optical axis of the imaging lens assembly 6000). The inner annular surface 240 connects the first side surface 210 and the second side surface 220, surrounds the central axis z, and is closer to the central axis z than the outer annular surface 230 is to the central axis z. The inner annular surface 240 includes the protrusion circles 270 surrounding the central axis z and arranged along the direction from the first side surface 210 towards the second side surface 220. Each of the protrusion circles 270 includes the protrusion structures 250 and the separation structures 260, and the protrusion structures 250 and the separation structures 260 of each of the protrusion circles 270 are alternately arranged to surround the central axis z. The other details of the annular optical element 200 have been described in the foregoing paragraphs of the 2nd embodiment and will not be described again herein.

In detail, In FIG. 2A and FIG. 2C, the outer annular surface 230 of the annular optical element 200 includes two gate traces 233 symmetrically located around the central axis z. Each of the protrusion structures 250 of one of the protrusion circles 270 and one of the separation structures 260 of another of the protrusion circles 270 adjacent to the one protrusion circle 270 are aligned in the direction from the first side surface 210 towards the second side surface 220. Numbers of the protrusion structures 250 of all of the protrusion circles 270 are equal. The bottom cross-section of each of the protrusion structures 250 is isosceles quadrilateral, and isosceles trapezoid in detail.

In FIG. 2A and FIG. 2D, each of the protrusion structures 250 is the two-step structure. When the number of the protrusion structures 250 of the annular optical element 200 is N, the following condition can be satisfied: 420<N<2000.

Furthermore, in FIG. 6, the lens set 6200 includes the lens elements 6201, 6202, 6203, 6204 and 6205 in order from a side near the imaged object to a side near an image surface (not shown herein). In addition, the imaging lens assembly 6000 further includes the annular optical element 200 and other optical elements (their reference numerals are omitted)

such as spacers, light blocking sheets and etc., wherein the lens elements 6201-6205 are respectively abutted with the aforementioned optical elements (including the annular optical element 200) to be disposed in the plastic barrel 6100. The receiving surface 214 of the first side surface 210 is abutted with the lens element 6204, and the receiving surface 224 of the second side surface 220 is abutted with a light blocking sheet 6301.

The data of the parameters H, T and T/H of the imaging lens assembly 6000 according to the 6th embodiment of the present disclosure are listed in the following Table 6, wherein the parameters are also shown as FIG. 2D and FIG. 6. The definitions of these parameters shown in Table 6 are the same as those stated in the imaging lens assembly 5000 of the 5th embodiment with corresponding values for the imaging lens assembly 6000.

TABLE 6

| 6th Embodiment | | | |
|---|---|---|---|
| H (mm) | 0.06 | T/H | 8.75 |
| T (mm) | 0.525 | | |

7th Embodiment

Figure 7:
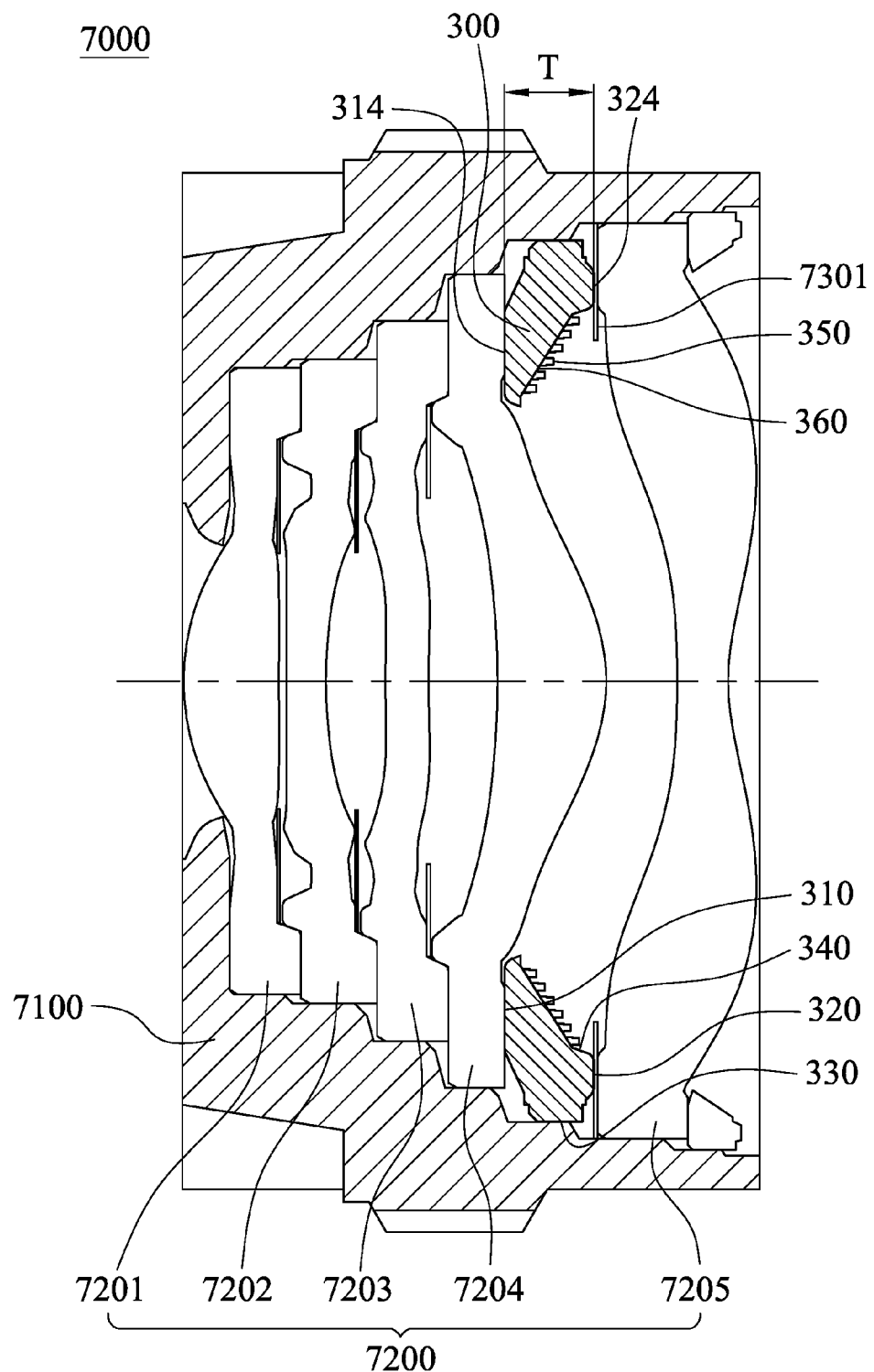
FIG. 7 is a schematic view of an imaging lens assembly according to the 7th embodiment of the present disclosure.

FIG. 7 is a schematic view of an imaging lens assembly 7000 according to the 7th embodiment of the present disclosure. In FIG. 7, the imaging lens assembly 7000 includes a barrel 7100, a lens set 7200 and the annular optical element 300 in the aforementioned 3rd embodiment, wherein the lens set 7200 and the annular optical element 300 are both disposed in the barrel 7100. The lens set 7200 includes a plurality of lens elements (7201-7205). In the 7th embodiment, the receiving surface 314 of the annular optical element 300 is connected to the lens element 7204.

In FIG. 3A to FIG. 3C and FIG. 7, the annular optical element 300 includes the first side surface 310, the second side surface 320, the outer annular surface 330 and the inner annular surface 340. The second side surface 320 is located correspondingly to the first side surface 310, and farther from an imaged object (not shown herein) than the first side surface 310 is from the imaged object. The outer annular surface 330 connects the first side surface 310 and the second side surface 320, and surrounds the central axis z of the annular optical element 300 (i.e. an optical axis of the imaging lens assembly 7000). The inner annular surface 340 connects the first side surface 310 and the second side surface 320, surrounds the central axis z, and is closer to the central axis z than the outer annular surface 330 is to the central axis z. The inner annular surface 340 includes the protrusion circles 370 surrounding the central axis z and arranged along the direction from the first side surface 310 towards the second side surface 320. Each of the protrusion circles 370 includes the protrusion structures 350 and the separation structures 360, and the protrusion structures 350 and the separation structures 360 of each of the protrusion circles 370 are alternately arranged to surround the central axis z. The other details of the annular optical element 300 have been described in the foregoing paragraphs of the 3rd embodiment and will not be described again herein.

In detail, In FIG. 3A and FIG. 3C, the outer annular surface 330 of the annular optical element 300 includes two gate traces 333 symmetrically located around the central axis z. Each of the protrusion structures 350 of one of the protrusion circles 370 and one of the separation structures 360 of another of the protrusion circles 370 adjacent to the one protrusion circle 370 are aligned in the direction from the first side surface 310 towards the second side surface 320. Numbers of the protrusion structures 350 of all of the protrusion circles 370 are equal. The bottom cross-section of each of the protrusion structures 350 is isosceles quadrilateral, and isosceles trapezoid in detail.

In FIG. 3A and FIG. 3B, each of the protrusion structures 350 is the two-step structure. When the number of the protrusion structures 350 of the annular optical element 300 is N, the following condition can be satisfied: 420<N<2000.

Furthermore, in FIG. 7, the lens set 7200 includes the lens elements 7201, 7202, 7203, 7204 and 7205 in order from a side near the imaged object to a side near an image surface (not shown herein). In addition, the imaging lens assembly 7000 further includes the annular optical element 300 and other optical elements (their reference numerals are omitted) such as spacers, light blocking sheets and etc., wherein the lens elements 7201-7205 are respectively abutted with the aforementioned optical elements (including the annular optical element 300) to be disposed in the plastic barrel 7100. The receiving surface 314 of the first side surface 310 is abutted with the lens element 7204, and the receiving surface 324 of the second side surface 320 is abutted with a light blocking sheet 7301.

The data of the parameters H, T and T/H of the imaging lens assembly 7000 according to the 7th embodiment of the present disclosure are listed in the following Table 7, wherein the parameters are also shown as FIG. 3D and FIG. 7. The definitions of these parameters shown in Table 7 are the same as those stated in the imaging lens assembly 5000 of the 5th embodiment with corresponding values for the imaging lens assembly 7000.

TABLE 7

| 7th Embodiment | | | |
|---|---|---|---|
| H (mm) | 0.08 | T/H | 6.56 |
| T (mm) | 0.525 | | |

8th Embodiment

Figure 8:
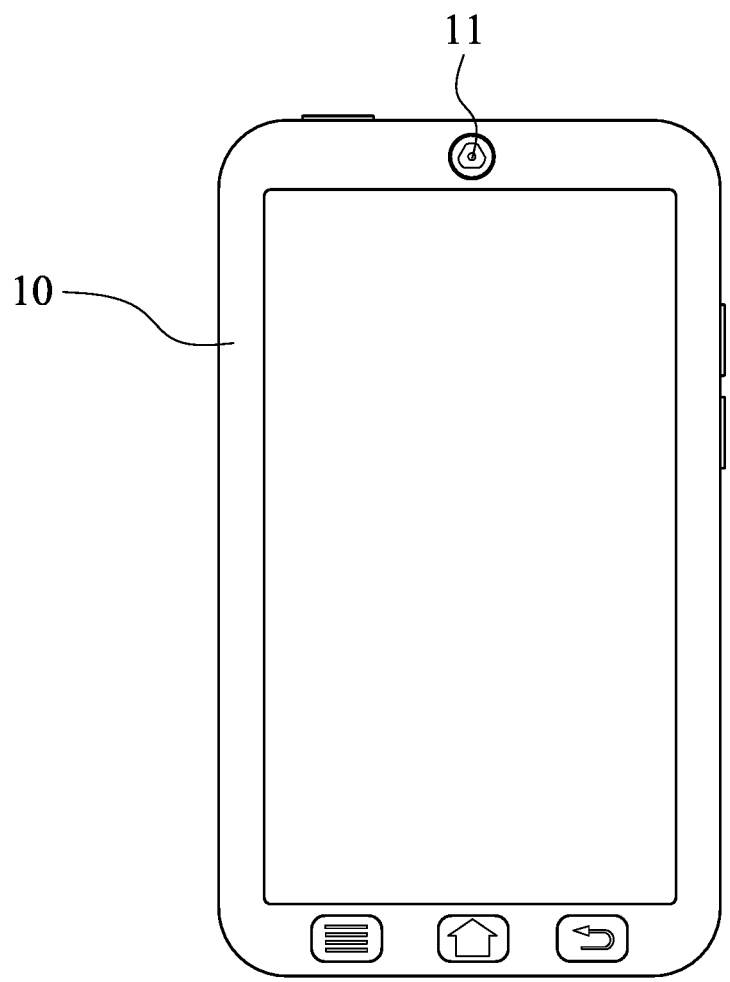
FIG. 8 shows an electronic device according to the 8th embodiment of the present disclosure.

FIG. 8 shows an electronic device 10 according to the 8th embodiment of the present disclosure. The electronic device 10 of the 8th embodiment is a smart phone, wherein the electronic device 10 includes an imaging apparatus 11. The imaging apparatus 11 includes the imaging lens assembly (not shown herein) according to the foregoing aspect and an image sensor (not shown herein), wherein the image sensor is disposed on an image surface of the imaging lens assembly, and the imaging lens assembly includes an annular optical element (not shown herein) according to the foregoing aspect. Therefore, it is favorable for effectively reducing the reflected stray light and enhancing the image quality so as to satisfy the requirements of electronic devices with high-end optical specifications. Preferably, the electronic device 10 can further include but not limited to a display, a control unit, a storage unit, a random access memory unit (RAM), a read-only memory unit (ROM) or a combination thereof.

9th Embodiment

Figure 9:
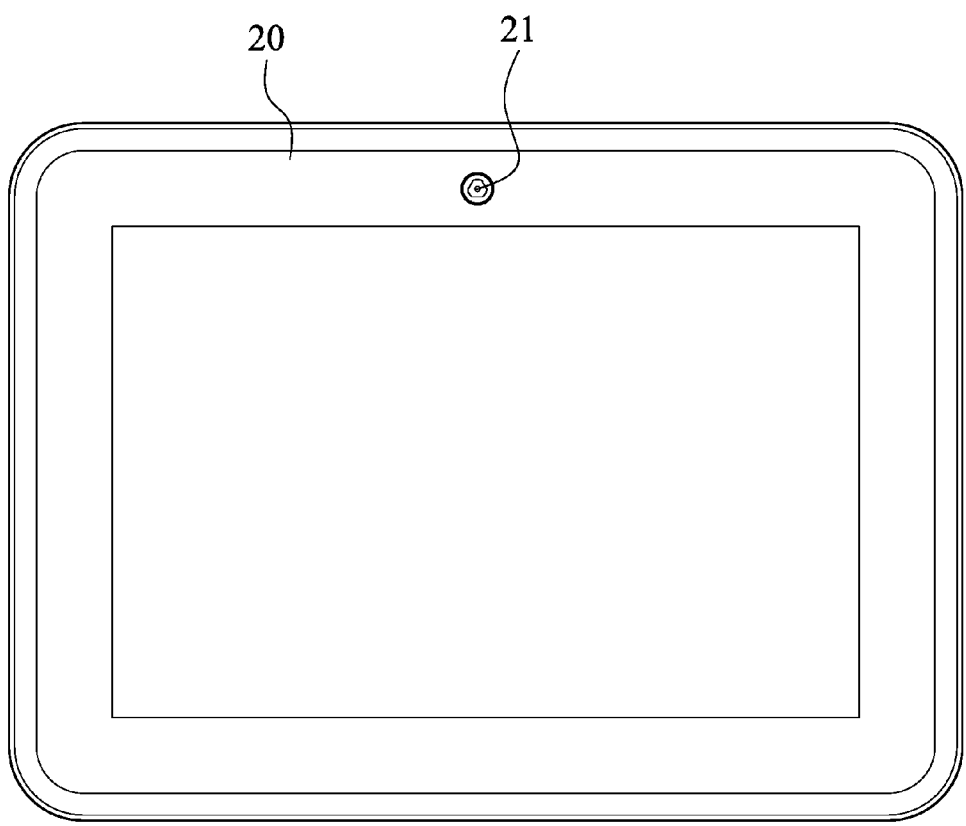
FIG. 9 shows an electronic device according to the 9th embodiment of the present disclosure.

FIG. 9 shows an electronic device 20 according to the 9th embodiment of the present disclosure. The electronic device 20 of the 9th embodiment is a tablet personal computer, wherein the electronic device 20 includes an imaging apparatus 21. The imaging apparatus 21 includes the imaging lens assembly (not shown herein) according to the foregoing aspect and an image sensor (not shown herein), wherein the image sensor is disposed on an image surface of the imaging lens assembly, and the imaging lens assembly includes an annular optical element (not shown herein) according to the foregoing aspect.

10th Embodiment

Figure 10:
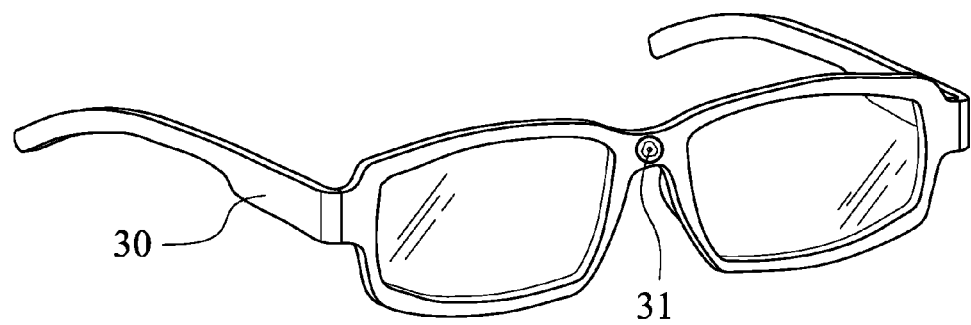
FIG. 10 shows an electronic device according to the 10th embodiment of the present disclosure.

FIG. 10 shows an electronic device 30 according to the 10th embodiment of the present disclosure. The electronic device 30 of the 10th embodiment is a wearable device, wherein the electronic device 30 includes an imaging apparatus 31. The imaging apparatus 31 includes the imaging lens assembly (not shown herein) according to the foregoing aspect and an image sensor (not shown herein), wherein the image sensor is disposed on an image surface of the imaging lens assembly, and the imaging lens assembly includes an annular optical element (not shown herein) according to the foregoing aspect.

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. An annular optical element, comprising:
a first side surface;
a second side surface located correspondingly to the first side surface;
an outer annular surface connecting the first side surface and the second side surface, and surrounding a central axis of the annular optical element; and
an inner annular surface connecting the first side surface and the second side surface, and surrounding the central axis, wherein the inner annular surface is closer to the central axis than the outer annular surface is to the central axis, and comprises:
a plurality of protrusion circles surrounding the central axis and arranged along a direction from the first side surface towards the second side surface, wherein each of the protrusion circles comprises a plurality of protrusion structures and a plurality of separation structures, and the protrusion structures and the separation structures are alternately arranged to surround the central axis;
wherein a height difference between each of the protrusion structures and one of the separation structures adjacent to thereof of each of the protrusion circles is H, and the following condition is satisfied:
0.02 mm<H<0.20 mm.

2. The annular optical element of claim 1, wherein the annular optical element with the protrusion structures is formed integrally.

3. The annular optical element of claim 2, wherein each of the protrusion structures of one of the protrusion circles and one of the separation structures of another of the protrusion circles adjacent to the one protrusion circle are aligned in the direction from the first side surface towards the second side surface.

4. The annular optical element of claim 3, wherein a bottom cross-section of each of the protrusion structures is quadrilateral.

5. The annular optical element of claim 4, wherein the bottom cross-section of each of the protrusion structures is isosceles quadrilateral.

6. The annular optical element of claim 3, wherein each of the separation structures is isosceles quadrilateral.

7. The annular optical element of claim 3, wherein a center-to-center spacing distance between one of the protrusion structures and another of the protrusion structures closest to thereof of each of the protrusion circles is Δd, and the following condition is satisfied:
0.06 mm<Δd<0.21 mm.

8. The annular optical element of claim 3, wherein a center-to-center spacing distance between one of the protrusion structures of one of the protrusion circles and one of the protrusion structures of another of the protrusion circles closest to the one protrusion circle in the direction from the first side surface towards the second side surface is Δr, and the following condition is satisfied:
0.03 mm<Δr<0.16 mm.

9. The annular optical element of claim 3, wherein numbers of the protrusion structures of all of the protrusion circles are equal.

10. The annular optical element of claim 3, wherein an area of each of the separation structures is A, and the following condition is satisfied:
0.005 mm²<10×A<0.08 mm².

11. The annular optical element of claim 3, wherein a number of the protrusion structures of the annular optical element is N, and the following condition is satisfied:
420<N<2000.

12. The annular optical element of claim 2, wherein a center-to-center spacing distance between one of the protrusion structures and another of the protrusion structures closest to thereof of each of the protrusion circles is Δd, a center-to-center spacing distance between the one protrusion structure and one of the protrusion structures of another of the protrusion circles closest to the one protrusion circle in the direction from the first side surface towards the second side surface is Δr, and the following condition is satisfied:
0.4<Δd/Δr<3.0.

13. The annular optical element of claim 2, wherein the height difference between each of the protrusion structures and one of the separation structures adjacent to thereof of each of the protrusion circles is H, and the following condition is satisfied:
0.03 mm<H<0.14 mm.

14. The annular optical element of claim 2, wherein the annular optical element is made of a black plastic material and formed by an injection molding method.

15. The annular optical element of claim 14, wherein the outer annular surface comprises:
at least two gate traces symmetrically located around the central axis.

16. The annular optical element of claim 2, wherein the number of the protrusion structures of the annular optical element is N, and the following condition is satisfied:
650<N<1500.

17. The annular optical element of claim 1, wherein each of the protrusion structures is a two-step structure.

18. The annular optical element of claim 17, wherein each of the protrusion structures comprises:

a first step structure; and a second step structure, wherein the first step structure is farther from a bottom cross-section of the protrusion structure than the second step structure is from the bottom cross-section of the protrusion structure;

wherein the height difference between the protrusion structure and one of the separation structures adjacent to thereof of the protrusion circle is H, a height of the first step structure is h1, a height of the second step structure is h2, and the following conditions are satisfied:

H=h1+h2; and 0.25<h1/h2<3.3.

19. An imaging lens assembly, comprising:

a barrel;

a lens set disposed in the barrel and comprising a plurality of lens elements; and at least one annular optical element disposed in the barrel and comprising:
  a first side surface;
  a second side surface located correspondingly to the first side surface;
  an outer annular surface connecting the first side surface and the second side surface, and surrounding a central axis of the annular optical element; and
  an inner annular surface connecting the first side surface and the second side surface, surrounding the central axis, wherein the inner annular surface is closer to the central axis than the outer annular surface is to the central axis, the inner annular surface comprises a plurality of protrusion circles surrounding the central axis and arranged along a direction from the first side surface towards the second side surface, each of the protrusion circles comprises a plurality of protrusion structures and a plurality of separation structures, and the protrusion structures and the separation structures are alternately arranged to surround the central axis;

wherein a greatest distance between the first side surface and the second side surface is T, a height difference between each of the protrusion structures and one of the separation structures adjacent to thereof of each of the protrusion circles is H, and the following condition is satisfied:

3.0<T/H<31.0.

20. The imaging lens assembly of claim 19, wherein the height difference between each of the protrusion structures and one of the separation structures adjacent to thereof of each of the protrusion circles is H, and the following condition is satisfied:

0.02 mm<H<0.20 mm.

21. The imaging lens assembly of claim 19, wherein each of the protrusion structures of one of the protrusion circles and one of the separation structures of another of the protrusion circles adjacent to the one protrusion circle are aligned in the direction from the first side surface towards the second side surface.

22. The imaging lens assembly of claim 21, wherein numbers of the protrusion structures of all of the protrusion circles are equal.

23. The imaging lens assembly of claim 19, wherein a bottom cross-section of each of the protrusion structures is quadrilateral.

24. The imaging lens assembly of claim 19, wherein each of the protrusion structures is a two-step structure.

25. The imaging lens assembly of claim 19, wherein the outer annular surface comprises:
  at least two gate traces symmetrically located around the central axis.

26. The imaging lens assembly of claim 19, wherein a number of the protrusion structures of the annular optical element is N, and the following condition is satisfied:

420<N<2000.

27. An imaging apparatus, comprising:
  the imaging lens assembly of claim 19; and
  an image sensor, wherein the image sensor is disposed on an image surface of the imaging lens assembly.

28. An electronic device, comprising:
  the imaging apparatus of claim 27.

* * * * *